United States Patent [19]
Hobson et al.

[11] Patent Number: 6,067,535
[45] Date of Patent: May 23, 2000

[54] MONITORING AND RETRAINING NEURAL NETWORK

[75] Inventors: Phillip William Hobson; Peter Hamer, both of Bishops Stortford; Kevin John Twitchen, Welwyn Garden; Paul Colin Barson, Hemel Hempstead; Simon Field, Welwyn Garden; Timothy John Edwards, Hertford, all of United Kingdom

[73] Assignee: Notel Networks Corporation, Montreal, Canada

[21] Appl. No.: 08/869,884

[22] Filed: Jun. 5, 1997

[30] Foreign Application Priority Data

Jan. 21, 1997 [GB] United Kingdom .................. 9701196

[51] Int. Cl.$^7$ ....................................................... G06N 3/02
[52] U.S. Cl. ................................. 706/10; 706/16; 706/25
[58] Field of Search .................................. 706/10, 16, 25, 706/26

[56] References Cited

U.S. PATENT DOCUMENTS

| | | | |
|---|---|---|---|
| 5,014,219 | 5/1991 | White | 706/25 |
| 5,253,302 | 10/1993 | Massen | 382/110 |
| 5,402,519 | 3/1995 | Inoue et al. | 706/16 |
| 5,402,522 | 3/1995 | Alkon et al. | 706/26 |
| 5,542,054 | 7/1996 | Batten, Jr. | 706/26 |
| 5,586,175 | 12/1996 | Link . | |
| 5,737,716 | 4/1998 | Bergstrom et al. | 704/202 |

FOREIGN PATENT DOCUMENTS

| | | |
|---|---|---|
| 0416173A1 | 8/1989 | European Pat. Off. . |
| 0493292A2 | 11/1991 | European Pat. Off. . |
| 0583135 A2 | 2/1994 | European Pat. Off. . |
| 2303275 | 2/1997 | United Kingdom . |
| WO94/06103 A1 | 3/1994 | WIPO . |
| WO94/11959A1 | 5/1994 | WIPO . |
| WO95/01707A1 | 1/1995 | WIPO . |
| WO96/08907 A2 | 3/1996 | WIPO . |
| WO96/31043 A1 | 10/1996 | WIPO . |

OTHER PUBLICATIONS

Toll–Fraud Detection (Author: Ben P Yuhas) pp. 239–244.
Neural Network Detection of Fraudulent Calling Card Patterns (Authors: J T Connor, L R Brothers, J Alspector) IWANNT 95 Conference May 1995, pp. 363–370.

Primary Examiner—Eric W. Stamber
Assistant Examiner—Wilbert L. Starks
Attorney, Agent, or Firm—Lee, Mann, Smith, McWilliams, Sweeney & Ohlson

[57] ABSTRACT

A method of managing the processing of information using a first neural network, the information relating to the transmission of messages in a telecommunications network, uses the steps of:

(i) monitoring the performance of the first neural network in processing the information;

(ii) creating a second neural network of the same topology as the first when a predetermined performance threshold is reached, and (iii) retraining the second neural network while continuing to process the information using the first neural network. If the neural networks are implemented using objects, such retraining can be facilitated by using a persistance mechanism to enable the objects to be stored and moved. Applications in fraud detection.

17 Claims, 17 Drawing Sheets

| Element Name | Position (From 0) | Format |
|---|---|---|
| CALL_START_DT | 9 | YYYY-MM-DD:MM:SS.ss |
| LONG_DUR_CALL_IND | 12 | 1—First 6 hours<br>2—Middle<br>3—Completed |
| SERVICE_FEATURE_CODE  15 | 15 | 00—Other<br>10—Three way calling<br>12—Call forwarding<br>14—Call forward busy |
| ORIG_TELNO | 16 | CHAR(24) |
| CALL_DURATION | 20 | MMMMSS |
| ORIG_NNG | 22 | DDDD |
| DEST_NNG | 23 | DDDD |
| DAY_OF_WEEK | 24 | 1-7 (Mon=1, Sun=7) |

*Fig. 10*

|     | Attribute name | Type |
| --- | --- | --- |
|     | AccountNumber | String |
|     | CallForward | Boolean |
|     | LongCall | Boolean |
|     | Duration | Integer |
|     | Destination | Enum {Local, National, International} |
| 171 | DayOfWeek | Enum {Monday,Tuesday,......., Sunday} |
| 172 | CallTime | Time |

| Profile Field No. | Attribute | Coverage Time Period | Type | Range |
|---|---|---|---|---|
| 1 | % Local | | float | 0.00—1.00 |
| 2 | % National | | float | 0.00—1.00 |
| 3 | % International | | float | 0.00—1.00 |
| 4 | Total Number of Calls | | float | N/A |
| 5 | Average Duration | | float (number of seconds) | N/A |
| 6 | Number of Long Calls | | float | N/A |
| 7 | No. of Call Forwards | | float | N/A |
| 8 | % Monday | 00:00:00—23:59:59 | float | 0.00—1.00 |
| 9 | % Tuesday | 00:00:00—23:59:59 | float | 0.00—1.00 |
| 10 | % Wednesday | 00:00:00—23:59:59 | float | 0.00—1.00 |
| 11 | % Thursday | 00:00:00—23:59:59 | float | 0.00—1.00 |
| 12 | % Friday | 00:00:00—23:59:59 | float | 0.00—1.00 |
| 13 | % Saturday | 00:00:00—23:59:59 | float | 0.00—1.00 |
| 14 | % Sunday | 00:00:00—23:59:59 | float | 0.00—1.00 |
| 15 | % 7am -> 7pm Monday | 07:00:01—19:00:00 | float | 0.00—1.00 |
| 16 | % 7pm Monday -> 7am Tuesday | 19:00:01—07:00:00 | float | 0.00—1.00 |
| 17 | % 7am -> 7pm Tuesday | 07:00:01—19:00:00 | float | 0.00—1.00 |
| 18 | % 7pm Tuesday -> 7am Wednesday | 19:00:01—07:00:00 | float | 0.00—1.00 |
| 19 | % 7am -> 7pm Wednesday | 07:00:01—19:00:00 | float | 0.00—1.00 |
| 20 | % 7pm Wednesday -> 7am Thursday | 19:00:01—07:00:00 | float | 0.00—1.00 |
| 21 | % 7am -> 7pm Friday | 07:00:01—19:00:00 | float | 0.00—1.00 |
| 22 | % 7pm Thursday -> 7am Friday | 19:00:01—07:00:00 | float | 0.00—1.00 |
| 23 | % 7am -> 7pm Friday | 07:00:01—19:00:00 | float | 0.00—1.00 |
| 24 | % 7pm Friday -> 7am Saturday | 19:00:01—07:00:00 | float | 0.00—1.00 |
| 25 | % 7am -> 7pm Saturday | 07:00:01—19:00:00 | float | 0.00—1.00 |
| 26 | % 7pm Monday -> 7am Sunday | 19:00:01—07:00:00 | float | 0.00—1.00 |
| 27 | % 7am -> 7pm Sunday | 07:00:01—19:00:00 | float | 0.00—1.00 |
| 28 | % 7pm Monday -> 7am Monday | 19:00:01—07:00:00 | float | 0.00—1.00 |

*Fig. 12*

| | | | | |
|---|---|---|---|---|
| File | Print | Windows | Help | |

File: cdrFile    Date: 31-10-96 .11:41 AM    Reload

Overall Statistics
Accounts: 599
Fraudulent: 46
Expected Behaviour 553

Selection Statistics
Accounts: 18
Fraudulent Behaviour 3
Expected Behaviour 15

Coverage: ◇ all    ◇ subset ◇ individual

Display
◇ Fraudulent
◇ expected
◇ both

Selection Criteria
◇ All
◇ Confidence (%) >= 95  <= 100
◇ Limit to

Order
◇ Confidence
◇ Duration

Number: 01279    Update

| Account | Behaviour | Confidence (%) | Duration (secs) | Validity |
|---|---|---|---|---|
| 01279402460 | Fraudulent | 99.99 | 23027 | Correct |
| 01279402012 | Expected | 99.99 | 3027 | Incorrect |
| 01279403610 | Fraudulent | 99.99 | 91513 | |
| 01279403076 | Fraudulent | 99.99 | 23027 | |
| 01279402946 | Fraudulent | 99.99 | 15859 | + Fraud |
| 01279403252 | Fraudulent | 99.99 | 253802 | - Expected |
| 01279402490 | Fraudulent | 99.99 | 23027 | |
| 01279402102 | Expected | 99.98 | 3027 | |
| 01279403210 | Fraudulent | 99.97 | 91513 | |
| 01279403046 | Fraudulent | 99.97 | 23027 | |
| 01279402046 | Fraudulent | 99.97 | 15858 | |
| 01279403259 | Fraudulent | 99.96 | 253802 | |

Validation
Correct | Incorrect | Clear | Clear All | Add Knowledge

Messages

*Fig. 17*

MONITORING AND RETRAINING NEURAL NETWORK

FIELD OF THE INVENTION

This invention relates to methods of managing the processing of information using a neural network, to methods of processing information relating to the transmission of messages, to methods of deriving output data from information about the transmission of messages, and to corresponding systems, and to software stored in computer readable form for such methods and systems.

BACKGROUND OF THE INVENTION

Anomalies are any irregular or unexpected patterns within a data set. The detection of anomalies is required in many situations in which large amounts of time-variant data are available. For example, detection of telecommunications fraud, detection of credit card fraud, encryption key management systems and early problem identification.

One problem is that known anomaly detectors and methods of anomaly detection are designed for used with only one such situation. They cannot easily be used in other situations. Each anomaly detection situation involves a specific type of data and specific sources and formats for that data. An anomaly detector designed for one situation works specifically for a certain type, source and format of data and it is difficult to adapt the anomaly detector for use in another situation. Known methods of adapting an anomaly detector for used in a new situation have involved carrying out this adaptation manually. This is a lengthy and expensive task requiring specialist knowledge not only of the technology involved in the anomaly detector but also of the application domains involved. The risk of errors being made is also high.

Another problem is that a particular method of anomaly detection is often most suitable for one particular situation. This means that transfer of a particular anomaly detector to a new situation may not be appropriate unless core elements of the anomaly detector method and/or apparatus are adapted. This is particularly time consuming and expensive particularly as the development of a new anomaly detector from scratch may often be necessary.

One application for anomaly detection is the detection of telecommunications fraud. Telecommunications fraud is a multi-billion dollar problem around the world. Anticipated losses are in excess of $1 billion a year in the mobile market alone. For example, the Cellular Telecoms Industry Association estimate that in 1996 the cost to US carriers of mobile phone fraud alone is $1.6 million per day, projected to rise to $2.5 million per day by 1997. This makes telephone fraud an expensive operating cost for every telephone service provider in the world. Because the telecommunications market is expanding rapidly the problem of telephone fraud is set to become larger.

Most telephone operators have some defence against fraud already in place. These are risk limitation tools such as simple aggregation of call-attempts, credit checking and tools to identify cloning, or tumbling. Cloning occurs where the fraudster gains access to the network by emulating or copying the identification code of a genuine telephone. This results in a multiple occurrence of the telephone unit. Tumbling occurs where the fraudster emulates or copies the identification codes of several different genuine telephone units.

Methods have been developed to detect each of these particular types of fraud. However, new types of fraud are continually evolving and it is difficult for service providers to keep "one-step ahead" of the fraudsters. Also, the known methods of detecting fraud are often based on simple strategies which can easily be defeated by clever thieves who realise what fraud-detection techniques are being used against them.

A number of rule-based systems have been developed, however, they have a series of limitations. It is now being acknowledged that each corporate and individual customer will show different behaviour, and thus a simple set of rules is insufficient to adequately monitor network traffic. To adapt these rule-based systems to allow each customer to have their own unique thresholds in not possible due to the sheer volumes of data involved.

There are a number of difficulties with identifying fraud, namely:

Fraud is dynamic by nature; fraudulent behaviour will change over time.

The size of the problem area is vast, due to the number of users on a network, and the number of calls made.

Rapid identification of fraud is needed; losses from a given case of fraud tend to grow exponentially.

Some forms of fraud are particularly costly and should therefore be the subject of special attention e.g. international phone calls.

Customer transparency; a customer should not see the fraud detection system in action.

Another method of detecting telecommunications fraud involves using neural network technology. One problem with the use of neural networks to detect anomalies in a data set lies in pre-processing the information to input to the neural network. The input information needs to be represented in a way which captures the essential features of the information and emphasises these in a manner suitable for use by the neural network itself. The neural network needs to detect fraud efficiently without wasting time maintaining and processing redundant information or simply detecting "noise" in the data. At the same time the neural network needs enough information to be able to detect many different types of fraud including types of fraud which may evolve in the future. As well as this the neural network should be provided with information in a way that it is able to allow for legitimate changes in behaviour and not identify these as potential frauds.

A particular problem for any known method of detecting fraud is that both static classification and temporal prediction are required. That is, anomalous use has to be classified as such, but only in relation to an emerging temporal pattern. Over a period of time an individual phone will generate a macroscopic pattern of use, in which, for example, intercontinental calls may be rare; however within this overall pattern there will inevitably be violations—on a particular day the phone may be used for several intercontinental calls. A pattern of behaviour may only be anomalous relative to the historical pattern of behaviour.

Another problem is that a particular type of information to be analysed by a neural network is often in a variety of formats. For example, information about individual telephone calls is typically contained in call detail records. The content and format of call detail records differs for different telecommunications systems and this makes it difficult for such information to be input directly to a neural network based system.

A further problem is that once information has been provided for input to a neural network based system it is often not suitable for other purposes. For example, when a neural network system is being used to detect fraudsters much information about the behaviour of customers is prepared for input to the system. This information could also be used for marketing purposes to develop a much more detailed understanding of customer behaviour. However, this is often not easy to effect because of the format of the data.

One problem with known methods of fraud detection is that they are often unable to cope adequately with natural changes in the input data. For example, a customer's telephone call behaviour may change legitimately over time; the customer may travel abroad and make more long distance calls. This should not be detected as an anomaly and be classified as a potential fraud. Because the telecommunications market size is increasing, this is a particular problem for fraud detection in telecommunications.

Known methods of anomaly or fraud detection which have used neural networks involve first training the neural network with a training data set. Once the training phase is over the neural network is used to process telecoms data in order to identify fraud candidates. As the behaviour of customers evolves, new data input to the neural network may be widely different from the original training data set. In these circumstances the neural network may identify legitimate new patterns in the data as anomalies. Similarly, real cases of fraud may go unidentified. In this situation it is necessary to retrain the neural network using an updated training data set which is updated to reflect new features of the data.

Several problems arise as a result of this need for retraining. For example, a decision needs to be made about when to retrain. Typically this complex decision is made by the user who requires specialist knowledge not only about telecoms fraud but also about the neural network system. Because telecoms fraud is an on-going problem which takes place 24 hours a day, 7 days a week, it is often not possible for an expert user to be available. This means that the system may "under perform" for some time before retraining is initiated.

Another problem is that the performance of the neural network system needs to be monitored in order to determine when the system is "under performing". This can be a difficult and lengthy task which takes up valuable time.

Another problem is that the process of retraining is itself a lengthy and computationally expensive process. Whilst retraining is in progress it is not possible to use the neural network system to detect anomalies. This means that telecoms fraud may go undetected during the retraining phase. Also, the retraining process may take up valuable processing resources which are required for other tasks. This is especially important in the field of telecommunications where it may be required to site the neural network system at a busy switch or node in the telecommuncations network.

A further problem is that intervention and input from the user is typically required during the retraining process. This can be inconvenient when it is necessary to retrain quickly and also requires a trained user to be available.

SUMMARY OF INVENTION

It is accordingly an object of the present invention to provide an apparatus and method which overcomes or at least mitigates one or more of the problems noted above.

According to a first aspect of the present invention, there is provided a method of managing the processing of information using a first neural network, the information relating to the transmission of messages in a telecommunications network, the method comprising the steps of:

(i) monitoring the performance of the first neural network in processing the information;

(ii) creating a second neural network of the same topology as the first when a predetermined performance threshold is reached, and (iii) retraining the second neural network while continuing to process the information using the first neural network.

This provides the advantage that the first neural network can be used to process the data whilst the second neural network is being retrained. Also, the second neural network may be retrained using separate processing resources from those used by the first neural network. For example, it is possible to train the second neural network at a quiet node in a communications network whilst the first neural network processes data at a busy node.

According to another aspect of the invention, there is provided a method of deriving output data from information about the transmission of messages in a communications network, using a neural network, wherein the neural network is implemented using at least one instantiated object created using an object oriented programming language, the method comprising the steps of:

(i) converting the object into a data structure;

(ii) storing the data structure; and (iii) recreating the object from the data structure.

According to another aspect of the invention, there is provided a method of deriving output data from information about the transmission of messages in a communications network, the method comprising the steps of:

deriving the data from the information using a neural network, wherein the neural network is implemented using at least one instantiated object created using an object oriented programming language; and using a persistance mechanism to store and retrieve the object.

This provides the advantage that if the neural network is implemented using an object oriented programming language it can be converted into a form that can be stored. Once converted into data structure format the data structure can be moved between processors which may be nodes in a communications network for example. This provides the advantage that the neural network can be moved to a quiet node to be trained. Also, in the event of a system crash or other such event, a stored version of the neural network can be retained and then recreated into object form when the system is up and running again.

Automatic retraining gives the advantage that it is not necessary for the user to make a decision about when to retrain. This removes the need for an expert user to be available to maintain the system while it is in use. Also, the retraining process itself is automatic so that valuable operator time is not wasted in performing a manual retrain. A further advantage, is that by making retraining automatic it is ensured that the outputs of the neural network are as accurate as possible.

Monitoring provides the advantage that a value is produced which indicates the performance of the neural network which is easy to interpret by a non-expert user. It is not necessary for a user who has specialist knowledge about the neural network system to evaluate the performance of the neural network manually.

According to other aspects of the invention there are provided corresponding systems.

Preferred features as set out in the dependent claims may be combined with each other or with any aspect of the invention as appropriate, as would be apparent to a person skilled in the art.

BRIEF DESCRIPTION OF THE DRAWINGS

The invention will be further described, by way of example, with reference to the accompanying drawings in which:

FIG. 10 shows an example of a call detail record specification.

FIG. 12 shows an example of a profile/signature.

FIG. 17 shows an example display screen provided by the GUI (Graphical User Interface).

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Definitions

Call detail record (CDR)—this is a set of information about an individual telephone call. For example, information such as the account number, the date and time of the call, whether it was long distance or local etc. A CDR is created whenever a phone call is completed. The content of a CDR may vary for different telecommunications systems.

CDR interpreter—this examines CDRs and extracts those fields necessary for anomaly detection.

Detection poll period—this is a time interval during which information is collected for input to the anomaly detector.

Profile/signature—this is a set of information summarising and describing the behaviour of an individual customer or account number over a given time period.

Anomaly—this is any irregular or unexpected pattern within a data set.

FCAPS Application Frameworks—systems for fault management, configuration management, accounting management, performance management and security management in a communications network.

Topology of a neural network—this is the number of units in the neural network, how they are arranged and how they are connected.

Kernel—this is the part of the anomaly detector which detects anomalies and performs many other functions.

Graphical user interface (GUI)—this provides means for communication between the user and the anomaly detector using display screens.

Figure 1:
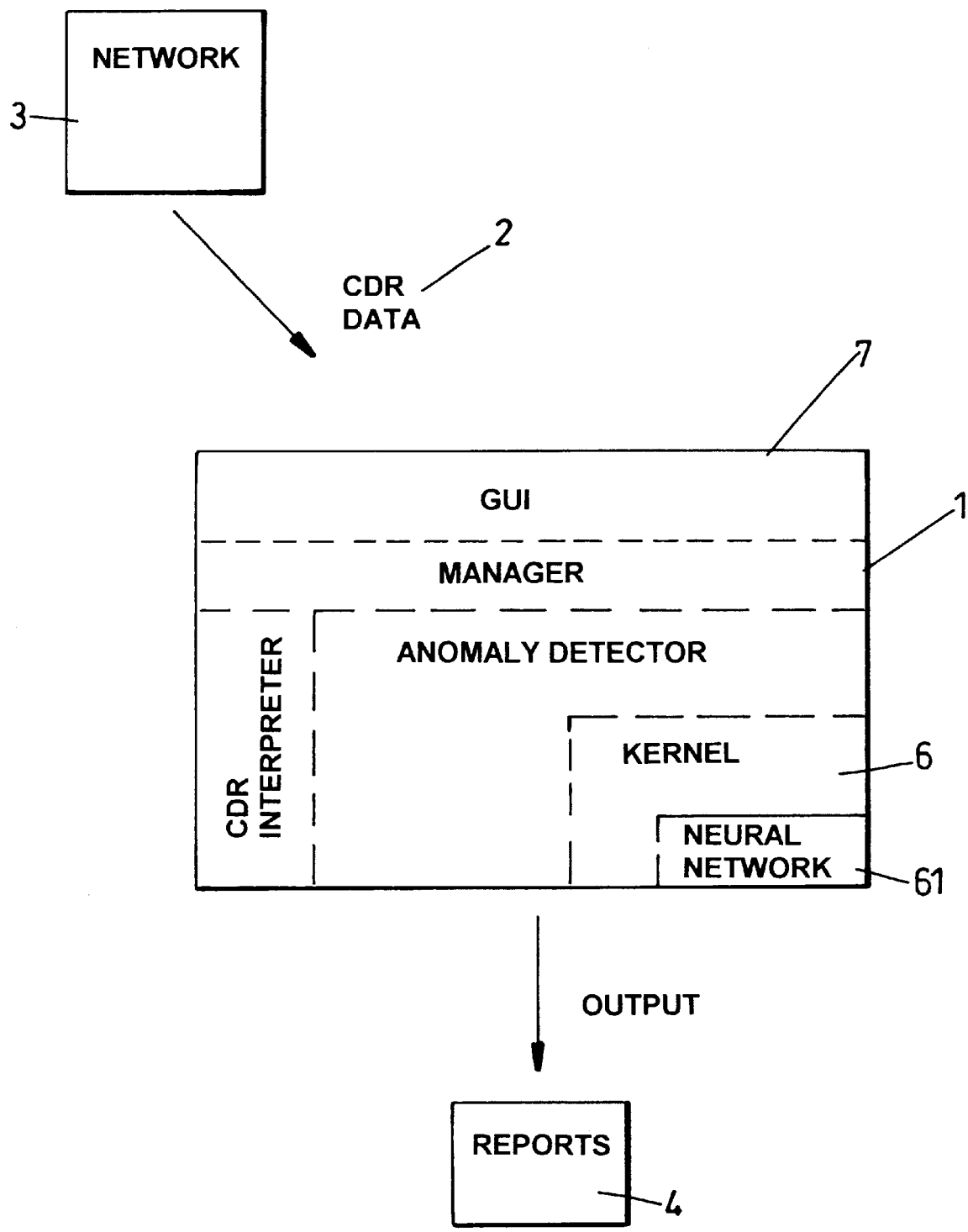
FIG. 1 is a general schematic diagram of an arrangement for the detection of anomalies in data relating to the transmission of messages in a communications network.
Figure 2:
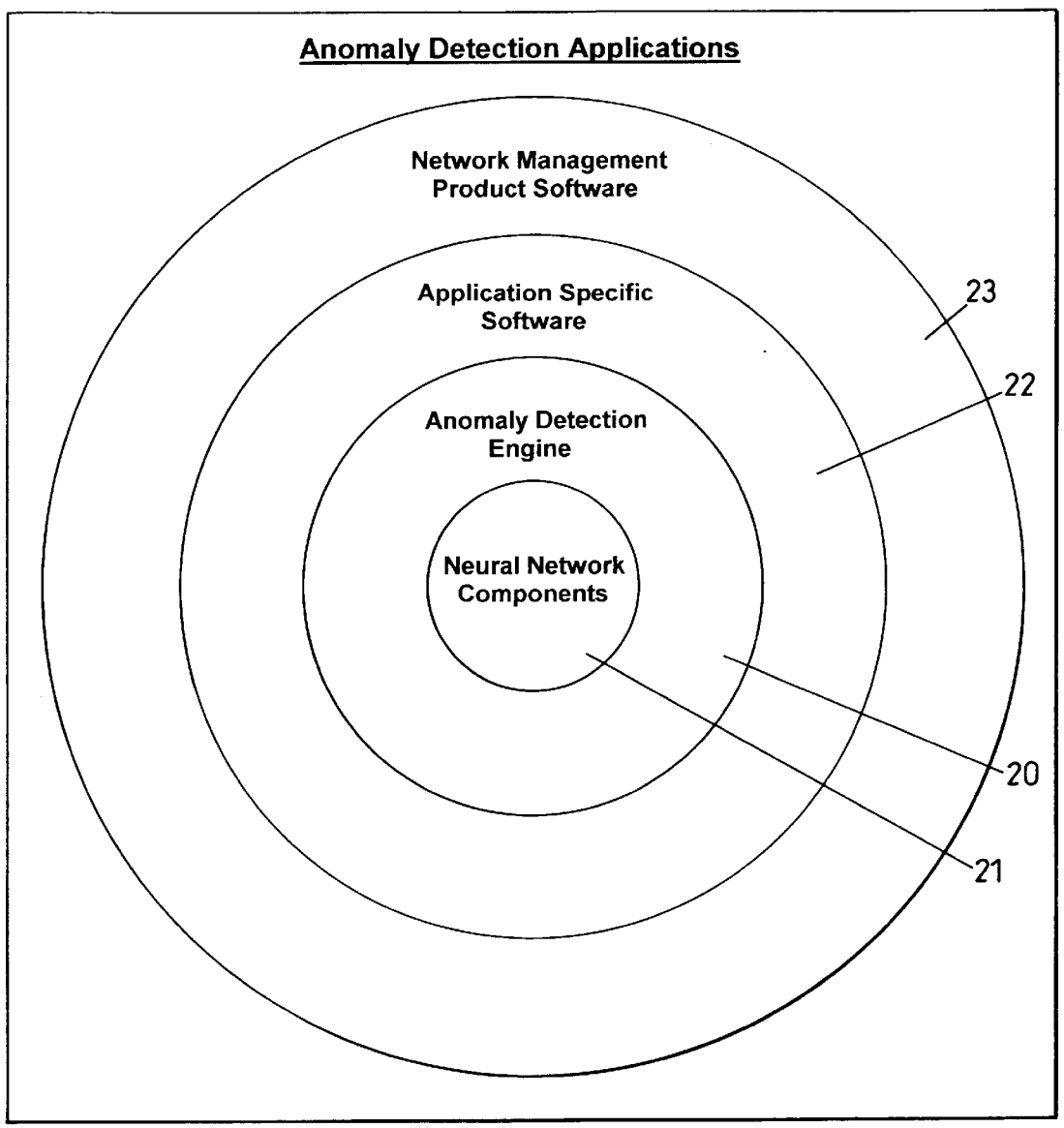
FIG. 2 is a general schematic diagram indicating how the anomaly detection engine is used with other components to create an anomaly detection application.

FIG. 1 shows schematically how an anomaly detector 1 can be used to receive information 2 about the transmission of messages in a communications network 3 and provide reports 4 about potential anomalies in the input data. The particular instantiation of the anomaly detector 1 is created using a generic anomaly detection engine (ADE) as shown in FIG. 2. This gives the advantage that the anomaly detection engine 20 is a reusable component which can be used in different individual applications.

FIG. 2 shows the anomaly detection engine 20 which contains neural network components 21. The neural network components 21 learn patterns in the input information 2 and detect differences in these patterns—the anomaly candidates. The ADE 20 also comprises many other components for example, an engine administrator which is also referred to as an ADE manager.

The ADE 20 is used in conjunction with application specific software 22. This is software which performs any data transformations that are needed in order to convert the network data 2 to be analysed into a format that the ADE 20 can use. The application specific software 20 also includes software to perform a validation of the anomaly candidates detected and also any software to convert the ADE's results into actions to be performed. If the ADE is embedded in a network manager 23 then the application specific software 22 includes interface software to allow the ADE to be embedded in this way.

Before the ADE can be used it must be instantiated and integrated into the user's environment. By using an ADE component 20 in conjunction with application specific software 22 a particular instantiation of an anomaly detector 1 is created. This process of creating a particular anomaly detector is referred to as instantiation. Following instantiation, the ADE is integrated into the user's environment. For example, a graphical user interface (GUI) 7 is added to the ADE to create a stand-alone application such as that shown in FIG. 1. Alternatively, the ADE is integrated into existing software such as a network manager 23, which communicates directly with the ADE. The instantiated anomaly detector can be used by only one element in a communications network 3 or alternatively it may be used by different network elements. For example, by embedding an ADE in an FCAPS application framework an anomaly detector suitable for use by different communications network elements is obtained.

As previously described the ADE contains neural network components 21 which learn the data patterns or behaviour and detect the differences in the behaviour—the anomalies. For a particular anomaly detection situation a particular neural network topology will be most suitable. Also, the neural network needs to be trained in order to have a set of weights that enable anomalies in the input data to be detected. If the ADE is simply reused in a new situation the topology and weights of the neural network components 21 may not be appropriate for the new situation. In order to get round this problem when an ADE is instantiated to form a particular anomaly detector the topology of the neural network components 21 can be automatically adjusted. The neural network components 21 can then be trained or retrained to achieve a desired set of weights. This provides the advantage that the ADE can be used in a variety of situations. The ADE can be applied "cross-product" and "cross-data layer". Cross-product means that the ADE can be applied to more than one type of communications network product. Cross-data layer means that the ADE can be applied to data gathered from the various layers of the communications network.

A general overview of how the ADE detects anomalies is now given by way of example. The ADE receives input information 2 about the transmission of messages in a communications network 3. This information 2 is in the form of call detail records (CDR's) and is processed by the ADE to form profiles (also referred to as signatures). A profile is a set of information summarising and describing the behaviour of an individual customer or account number over a given time period. Historic and recent profiles are formed where an historic profile relates to the behaviour of an individual customer over a certain period of time and a recent profile relates to the behaviour over a shorter and more recent period of time. The historic profiles are assumed to represent non-anomalous behaviour. By comparing the historic and recent profiles using the neural network components 21 anomalies in the recent profile are detected. Many pairs of historic and recent profiles are created and compared and over time the historic profiles are updated with non-anomalous information from the recent profiles.

Before anomaly detection can take place the neural network components 21 must be trained. The neural network components comprise a multi-layer perceptron neural network. This neural network is trained using a supervised training method. This involves inputting a training data set to the neural network so that the neural network is able to build up an internal representation of any patterns inherent in the data. The training data set contains profiles and information about whether these profiles are anomalous or not. This allows that neural network to learn the typical and exceptional behaviour profiles that occur in the network data and to classify them accordingly. Once the neural network has been trained it is validated to check that the training has been successful. This is done by presenting a new set of profiles, that are known to be anomalous or not, to the trained neural network. The outputs of the neural network are then compared with the expected outputs.

The successfully validated neural network can then be used to detect anomalies. New communications network data is presented to the ADE which uses the new data to form recent profiles. The neural network then compares the recent profiles with the historical profiles in order to detect anomalies. If there is a difference between the recent and historical profiles then the neural network can indicate whether this is due to anomalous behaviour by the system or whether it is simply due to an acceptable change in the behaviour profile. If a pattern of data that has never been encountered before is presented to the neural network then the neural network produces a best-guess result.

As time passes since the neural network was trained general trends in the data from the communications network occur. These trends are not taken account of by the neural network because the neural network was not trained on this data. In order to get round this problem the neural network can be retrained. This process can be carried out automatically using suitable application specific software.

As the ADE is used, further information about whether anomaly candidates produced by the ADE are real anomalies or not may be obtained by the user. Provision can be made for this information to be input to the ADE and used to update the training data set and various other information. This process is described in more detail below.

Main ADE Components

Figure 3:
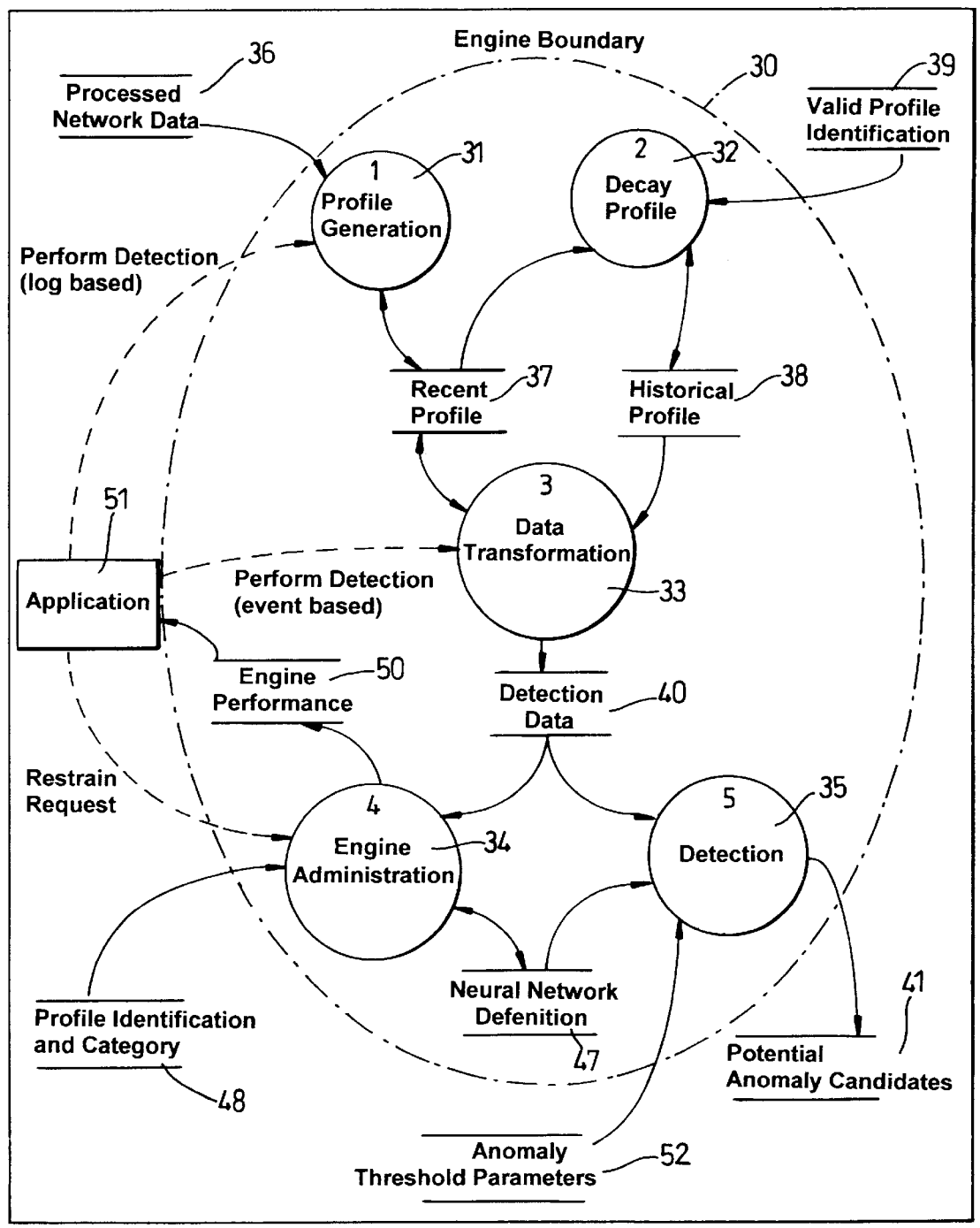
FIG. 3 shows the main components of an anomaly detection engine (ADE) and the flow of information between these components.

The main components of the ADE are now described and later the processes of instantiating an ADE and integrating it ready for use are described in detail with reference to examples. FIG. 3 shows the main components of the ADE and also the flow of information between these components. The main components comprise:

a profile generator 31;
a profile decay process 32;
a data transformer 33;
an engine administrator 34;
and a detector 35.

The ADE comprises all components inside the boundary 30 in FIG. 3. The area outside the boundary 30 refers to the particular instantiation of the ADE in application specific software. Data about the transmission of messages in a communications network that has been pre-processed into a specific format 36 is input to the profile generator 31. The profile generator 31 forms historic and recent profiles or signatures 37,38 of the input information 36. If necessary the historic profiles are updated with information from the recent profiles using the profile decay process 32. Information about whether anomaly candidates produced by the anomaly detector are really anomalies or not 39 can be input to the ADE and used to update the profiles and for other purposes. These processes are described further below.

Once the recent profile 37 and the historic profile 38 have been created and updated as required, they are input to the data transformer 33 which transforms them into a format required by the detector 5. For example, a recent profile and a historic profile pair may be concatenated, or the difference between the two profiles may be calculated. Other transformations are also possible. The transformed data 40 is used by the engine administrator 34 and the detector 35.

Engine Administrator

The engine administrator, also referred to as an ADE manager, is responsible for the following tasks:

1. training and/or retraining the neural network;
2. evaluating the performance of the ADE;
3. creating the neural network;
4. managing and maintaining a training data set and an evaluation or validation data set.

Figure 4:
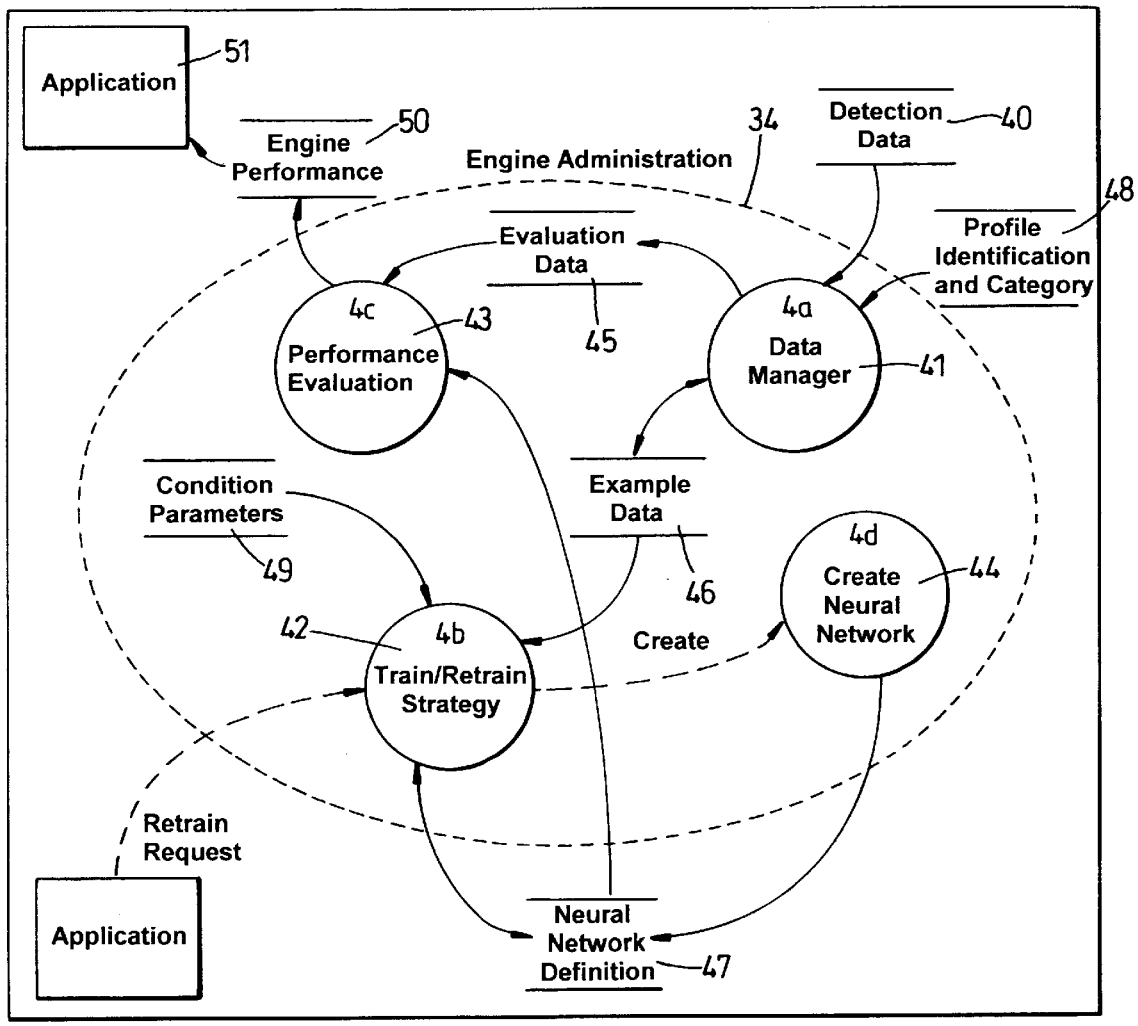
FIG. 4 shows the main components of the engine administrator and the flow of information between these components.

As shown in FIG. 4 the engine administrator 34 comprises a data manager 41; a training /retraining processor 42; an evaluator 43; and a processor for creating a neural network 44.

Data Manager 41

The data manager 41 maintains two data sets: an evaluation data set 45, and an example data set 46 which is also referred to as a training data set. The data manager receives inputs of detection data 40 and validated results 48. The validated results comprise information about whether anomaly candidates identified by the neural network 47 are real anomalies or not. These validated results 48 are also referred to as "profile identification and category" information; they are used to update the example data 46, the evaluation data 45 and for other purposes as described below. The evaluation data set 45 is created by splitting the detection data set 40 into two parts; an evaluation data set 45 and an example or training set 46. Both these sets of data contain profiles and information about whether each profile in the set is anomalous or not.

The example or training data set 46 is used to train the neural network 47 using the training processor 42. Adding new examples of anomalous behaviour 48 to this data set enables the detection to be updated with new information. This aids the general performance of the ADE; examples from false positive identifications can be added to the example data set to reduce the probability that the false identification recurs. Adding results from positive identifications reinforces the ability of the neural network 47 to make similar positive identifications.

Training/Retaining Process 42

The training process enables the ADE to learn, or relearn, a particular task. To obtain the optimum performance from the ADE, a representative data set 46 needs to be presented during training. This training data set 46 should include examples of anomalous events as well as non-anomalous events and preferably in a proportion that is representative of the data set to be analysed by the ADE. The neural network 47 is trained using a learning algorithm. Many different learning algorithms can be used and in a preferred example a non-parameterised learning rule, the known scaled conjugate gradient algorithm, is used. Condition parameters 49 are input to the training/retraining process 42. These parameters can be input by the user or may be predefined. They include information specific to the training/retraining process such as how many training epochs should be carried out and whether early stopping should be invoked. Retraining can be carried out automatically without intervention by the user as described below. This is done by using specially adapted application specific software. The process of retraining can involve the creation of a second neural network that has the same topology as the original neural network 47 and retaining the second network. This is described in detail below.

Performance Evaluator 43

Once the ADE has been trained, a validation process 43 is used to determine the performance that the ADE has for the particular task. The performance of the ADE is determined by presenting the evaluation data set 45 to the neural network 47 using the performance evaluator 43. The evaluation data set 45 contains profiles and information about whether these profiles are anomalous or not. The profiles are presented to the neural network 47 and the anomaly candidates produced by the neural network 47 are compared with the expected outputs by the performance evaluator 43. The performance evaluator 43 then calculates a value 50 which indicates the level of similarity between the actual and expected outputs of the neural network. This value 50 is then provided to application specific software 51.

Neural Network Creation Process 44

For each instantiation of the ADE a separate neural network 47 is required. The neural network creation process 44 creates a neural network of a given internal architecture. The creation process 44 creates a multi-layer perceptron (MLP) that is either fully connected or not fully connected. The MLP can be created with different numbers of input, output and hidden units. The number of hidden layers can also be varied. It is not essential that the creation process create a multi-layer perceptron type neural network. Other types of neural network such as a self-organising map could be created and used to detect anomalies.

Detector 35

Once the data from the two profiles has been prepared, the neural network has been created and evaluated by the administrator 34, the neural network 47 is simply presented with the new detection data 40. Referring to FIG. 3, the detector 35 receives the detection data 40 and using the trained and validated neural network 47 carries out the detection process to produce potential anomaly candidates 41. The neural network classifies each recent profile either as an anomaly or not and the neural network 47 also gives an associated confidence value for each classification. Anomaly threshold parameters 52 are input to the detector 35 from application specific software. These parameters 52 are used to filter the potential anomaly candidates 41 to remove the majority of false positive identifications. For example, all anomaly candidates with a very low confidence rating could be filtered out.

Instantiating and Integrating the ADE to Form a Specific Anomaly Detection Application The ADE is a library of software components which can be used to detect anomalies in data about the transmission of messages in a communications network. The components need to be tailored for each specific application and once instantiated form an engine which can then be integrated into a software system. The ADE has an application programming interface (API). The application specific software 22 communicates with the ADE via this API.

Application Programming Interface (API)

The API enables 8 different method calls to be made on the ADE from the application specific software 22. That is 8 different instructions can be given to the ADE including:

1. CreateAnomalyDetector
2. TrainAD
3. PerformDetection
4. EvaluatePerformance
5. SwitchADs
6. AddKnowledge
7. UpdateProfiles
8. DeleteAD These instructions are examples only and other types of instructions could be used. Each of these 8 instructions are now described:

CreateAnomalyDetector

This instruction requires that information about the location of an anomaly detector creation specification and a training data set is supplied when the instruction is made. This information is supplied by the application specific software 22, for example, it may be input by the user through a GUI. When this instruction is given to the ADE an anomaly detector is created which includes a neural network based on the creation specification and the training data set. The anomaly detector creation specification contains information about the minimum size for the training data set as well as other information as described below. Once the anomaly detector has been created a signal is returned to the application specific software 22 to indicate that the neural network is ready.

TrainAD

This instruction causes the training/retraining process 42 to train or retrain the neural network using the training data set and any retraining data that is available. Once the neural network has been trained or retrained information is sent back to the application specific software. This includes information about the location of the trained/retrained neural network and a classification error. The classification error is a value which indicates the proportion of inputs that were misclassified by the neural network during an evaluation of the performance of the neural network.

PerformDetection

This instruction requires that information about the location of a detection data set 40 is provided to the ADE. When this instruction is given the detector 35 in the ADE performs a detection using the supplied detection data set. This is the normal mode of operation for the engine. A series of real presentations are supplied, which the neural network attempts to classify as being anomalies or not. When the detection is completed the ADE returns a data set to the application specific software 22. This is a list showing which category (anomaly or not) the ADE classified each input into together with a confidence rating for each classification.

EvaluatePerformance

When this instruction is given to the ADE the performance evaluator 43 carries out an evaluation using the evaluation data set 45. When the performance evaluation is completed a classification error is returned to the application specific software. This gives an indication as to how many mis-classifications were made by the neural network. A mis-classification occurs when the neural network returns a detection result based on a known input-output pair, which does not match the correct output for that particular input.

SwitchADs

When this instruction is given to the ADE a recently trained second neural network (that was created during the retaining process and is contained in a second anomaly detector) is switched with the current active neural network. That is, the current active neural network is replaced by the newly trained neural network. If a switch is attempted before a second neural network has been created an error message is returned to the application specific software 22.

AddKnowledge

This instruction requires that information about the location of a data set containing validated results 48,39 is provided with the instruction. When the instruction is given, a retraining data set is created or updated within the ADE using the new information. When the updating process is completed information about the location and existence of the retaining data set is returned to the application specific software.

UpdateProfiles

This instruction requires that information about the location of the presentation data set to be provided when the instruction is given. When the instruction is given the historic profiles are updated using information from the recent profiles using the profile decay process 32. When the updating process is completed information about the location of the updated presentation data set is returned to the application specific software 22. It is also possible for the recent profiles to be updated with current information as described below.

DeleteAD

When this instruction is given the anomaly detector is deleted. Any memory that was used to store the anomaly detector is released.

Preferably the API (and the ADE) is created using an object oriented programming language such as C++. An object referred to as an ApplicationBridge object is provided which makes available each of the 8 methods or instructions described above. Each of the 8 methods has an associated valid "return event" method. In order to add further capabilities required by a specific application the user must create further software which inherits from the Application-Bridge object and overloads the return event methods. It is not essential however for the API and indeed the ADE software to be created using an object oriented programming language. Other programming languages could be used.

Anomaly Detector Creation Specification

This contains three parameters and information about the location of a neural network creation specification. Preferably the anomaly detector creation specification is an object created using an object oriented programming language. It is used by the ADE to instantiate all the C++ objects. The three parameters are:

1. an update factor—this specifies the update factor that is to be used in the algorithm for updating profiles as described below.
2. a retrain factor—this is a threshold which must be met before retraining takes place. For example, it can be the proportion of retraining data to original training data required in order to make it worthwhile retraining.
3. a minimum training data parameter—this is a threshold which must be met before training occurs. It reflects the confidence in the training data and the neural network's ability to train on a restricted data set. This value is the minimum amount of original training data required before the neural network will be trained.

In order to produce an anomaly detector creation specification it is necessary to first construct a neural network creation specification.

Neural Network Creation Specification

The neural network creation specification contains information about the location of two other specifications, the layered network specification and the network trainer specification. Preferably the neural network creation specification is formed using an object oriented programming language and is linked to the anomaly detector creation specification object, a layered network specification object and a network trainer specification. The layered network specification and the network trainer specification should be created before the neural network creation specification.

Layered Network Specification

This contains the specification for a particular type of layered neural network. A list of three values is given which specify:

1. the number of units in the input layer;
2. the number of units in the hidden layer;
3. the number of units in the output layer.

A list of weights can also be given. This is a list of values for each of the weights between the connections in the neural network. If the specification is for a trained neural network then a list of weights must be given. If the specification is for an untrained neural network then no weights are necessary. The number of input units is determined with reference to the number of attributes of the input data that are deemed significant. The number of units in the hidden layer can be determined either empirically or by statistical analysis using known methods. The number of units in the output layer depends on the number of classifications the user requires for the particular task. It is also possible to specify whether the neural network should have a fully-connected architecture or a partially connected architecture. If a partially connected architecture is selected the specific connections are specified in the list of weights.

Network Trainer Specification

This contains information required by the neural network during training. 7 parameters are included:

1. target error—this is a threshold error value which must be achieved before training stops. If the target error is set to 0 then the threshold is ignored. The target error is specified as the sum of squared errors over the training set. That is, the training set is presented to the neural network and the output values are subtracted from the expected output values to give a set of errors. The sum of the squares of these errors is then calculated.

2. percentage validation—this specifies the percentage of training data that will be regarded as validation data and will not be used for training. This parameter is only significant if early stopping is used.

3. is-early-stopping-required—this is a Boolean value which indicates whether training should be stopped early in order to achieve generalisation. In most cases this is set to true. Early stopping means stopping the training process earlier than usual so that overfitting does not occur. If the neural network is trained too much it will not be so good at generalising or producing "best guess" results when new data is presented. This is because the training data has been overfitted or learnt too specifically.

4. number_of training_cycles—this specifies the number of training cycles that will be performed. If this value is set to zero the neural network is retrained. That is, the weights are not randomised before training begins.

5. random_seed—this seeds the random number generator that is used to initialise the weights and choose the validation set. When this value is set to −1 the random number generator is seeded using a value derived from the system clock. This maximises the unpredictability of the generated numbers and is the usual value for this parameter. When this value is set to a positive number this value is used as the seed. This option is intended for purposes such as regression testing and debugging where the same sequence of pseudo-random numbers may be required every time.

6. max_number_of steps—this parameter specifies the maximum number of steps that the trainer can take. If this parameter is set to zero then this test is ignored. This is the usual value for this parameter. A non zero value indicates the number of steps at which to stop a training cycle if it has not stopped previously for some other reason.

7. fractional_tolerance—this value indicates a threshold for the amount of improvement that should occur as a result of one training step. When the threshold is reached training stops. A zero value indicates that training should stop when a step produces an effect that is small compared with the accuracy of the floating-point calculations. A non zero value indicates that training should stop when the relative improvement as a result of a step is below the value given. For example, values in the range 10−2 to 10−6 are suggested.

The ADE is generic in nature and requires an additional layer of instantiation software (or application specific software 22) to provides further functionality. For example, the instantiation software may provide a GUI, data pre/post processing and interfaces to the external world. As a minimum requirement the application specific software must allow the user to give any of the 8 API method instructions or calls to the ADE. The parameters required by each method call must also be provided in the correct format. For example, historic and recent profiles must be of a specified format, as must any specifications and data sets.

The process of instantiating an ADE will now be described by way of example. In this example the ADE is to be instantiated and used to detect fraudulent usage on a mobile telephone or fixed telephone network. Also, the data to be analysed by the ADE is in the form of call detail records which have been pre-processed into the format required by the ADE.

The steps involved in the instantiation process include:
arrange for the application specific software to supply the CDRs in the correct format to the ADE
create an anomaly detector creation specification (this includes the step of creating a neural network creation specification);
create the anomaly detector;
create the training data set, validation data set and presentation data set;
train the neural network;

When these steps have been performed the instantiated ADE is ready to detect fraudulent telephone accounts. The application specific software should also be arranged to allow the other instructions or method calls (add knowledge; retrain; switch; delete) to be sent to the ADE.

Create an Anomaly Detector Creation Specification

This entails determining the values for the various parameters. In this example the ADE is formed using an object oriented programming language. In this cases a call is made on an anomaly detector creation specification object constructor. This causes the anomaly detector creation specification to be created. The parameters should be calculated prior to the creation of the anomaly detector and inserted into the anomaly detector creation specification. The optimum set of parameter values should be used in order to obtain the best detection results. For example, the number of output units for the neural network is determined according to the type of data being analysed. For fraud detection two output units can be used, one for fraud and one for non-fraud. The analysis of raw network data is required to help in the definition of the key attribute/fields and values that are needed for the anomaly detector specification.

Create the Anomaly Detector

The anomaly detector objects are created by giving an instruction to start the CreateAnomalyDetector method and supplying information about the location of the anomaly detector specification and training data set.

Create the Training Data Set, Validation Data Set and Presentation Data Set

The CDR data must be transformed in order to produce the training, validation and detection data sets. One approach for doing this involves:

splitting the CDR data into 3 sets, training, validation and detection, whereby the training set is substantially larger than the validation set deciding on small arbitrary window sizes for the historical and recent profiles. The term window size refers to the time period over which the profiles represent telephone call behaviour. For example, for a 3 month supply of CDR data, the historical window size could be 5 days and the recent window size could be 0.5 days.

Selecting attributes from the CDR data and forming the profiles as well as labelling each profile as to whether it is fraudulent or not.

Training the neural network with the new training data set and observing the detection results.

If the neural network performance appears relatively low, gradually increase the window sizes and retrain.

If the neural network performance reaches a level required by the user then the window sizes are deemed correct and are used for profiles in all data sets.

The creation of a historic profile for a new customer account needs to be done at the instantiation layer (application specific software). The historic profile should be a direct copy of the recent profile with a label to indicate that it is a new customer account. Also, data for a profile needs to be consecutive, i.e. if it is determined that a recent profile required 5 hours of data, then 5 consecutive hours need to be used for the recent profile, not just any 5 hours. This means that gaps in the CDR data may cause problems. However, this depends on the relative size of the "gap". For example, if there is a one hour gap in a months worth of data then there is unlikely to be a problem. Another point is that the window sizes for the historic and recent profiles must be for consecutive time periods. For example, the historic time period may be from January 1 to January 31 whilst the recent profile window is from January 31 to February 5.

Train the Neural Network

This process involves cyclically adjusting the weights stored on the connections between units in the neural network, until sufficient training has been performed. This is done by sending an instruction to the ADE to start the TrainAD method.

Once the ADE has been instantiated or tailored for a specific application it is integrated into the system software. To do this integration code is used to bridge from the tailored ADE to the system software. This integration code is application specific. Many different possible forms for the integration code are possible. The integration code should take account of the following issues:

management issues architecture issues software issues data issues

Management Issues

The integration software must manage the ADE. The functions which must be performed are:

Monitoring the performance of the ADE. The application which the ADE will be used in will need to determine the appropriate performance measurement. The engine will return a mis-classification value when a performance evaluation is requested. This mis-classification is obtained by presenting the training set together with any additional knowledge added to the engine, and counting how many of these are given an incorrect result.

Deciding the threshold performance level for retraining.

Deciding when to retrain the neural network.

Architecture Issues

Architectural considerations are:

How to access appropriate data stores in order to provide necessary input data from which to perform detection and where to locate data stores, either locally or distributed.

How to update the persistent store of the neural network creation specifications, which is part of the anomaly detector specification, when the ADE is retrained. The specification is passed back through the API when the training is complete.

Software Issues

The integration code can have the following functionality:

If the ADE is event based it may easily be converted into call-return form by writing a small amount of interface code.

Storage of the anomaly detector specification data needs to be considered. The anomaly detector specification will need to be accessible by the user at some point after start-up in the following situations: system crash, process killed and needs to be re-started.

Storage of the historical profiles also needs to be considered. The historical profiles will be stored externally of the ADE, and accessed when required.

Storage of the original training data set, and the additional knowledge (data) gathered through use of the ADE is also required. The additional knowledge is needed by the ADE for re-training, in order to improve its future performance.

Deletion of any objects output from the ADE—detection results, any data sets, and the anomaly detector specification.

Any objects which are passed into the ADE will be deleted by the ADE software—training data set, data input to use in detection mode, any knowledge added, the profiles, and the anomaly detector specification.

Data Issues

The integration software is responsible for:

Maintaining an appropriate set of data for initially training the ADE. This process must result in a data set whose data coverage is sufficient to allow successful training of the ADE.

Maintaining an appropriate data set for retraining the ADE. Additional knowledge must be obtained by interaction with the user. This knowledge must be obtained by interaction with the user. This knowledge must be used to form a retraining data set which is to be utilised when a request is made, by the user, to add knowledge back into the ADE.

Updating historic profiles over time. This is done by allowing the recent profile data to migrate into the historical profile. This relies upon the recent profile being assessed as non-fraudulent, as it would be counter-productive to allow a non-fraudulent historical profile to be updated using a fraudulent recent profile.

Some form of feedback loop is therefore needed in order for the fraudulent profiles output by the instantiation layer to be verified. The resultant fraud candidates will need to be assessed and the results of the assessment will need to be fed back into the instantiation layer in order for the correct profile adjustment to be made. Any non-fraudulent output will be allowed to update the associated historical profile without the need for a validation step.

Assessing the raw communications network data. This can either be a manual or automatic process of obtaining account details from the appropriate communications network.

A particular example of an instantiated ADE will now be described. In this example an anomaly detector is formed using an ADE together with application specific software which makes it possible for automatic retraining of the neural network components to take place. In this example, the particular instantiation of the ADE is referred to as a kernel within the anomaly detector. The major components of the kernel with respect to the fraud detector application domain, are set out in Appendix A below.

Figure 14:
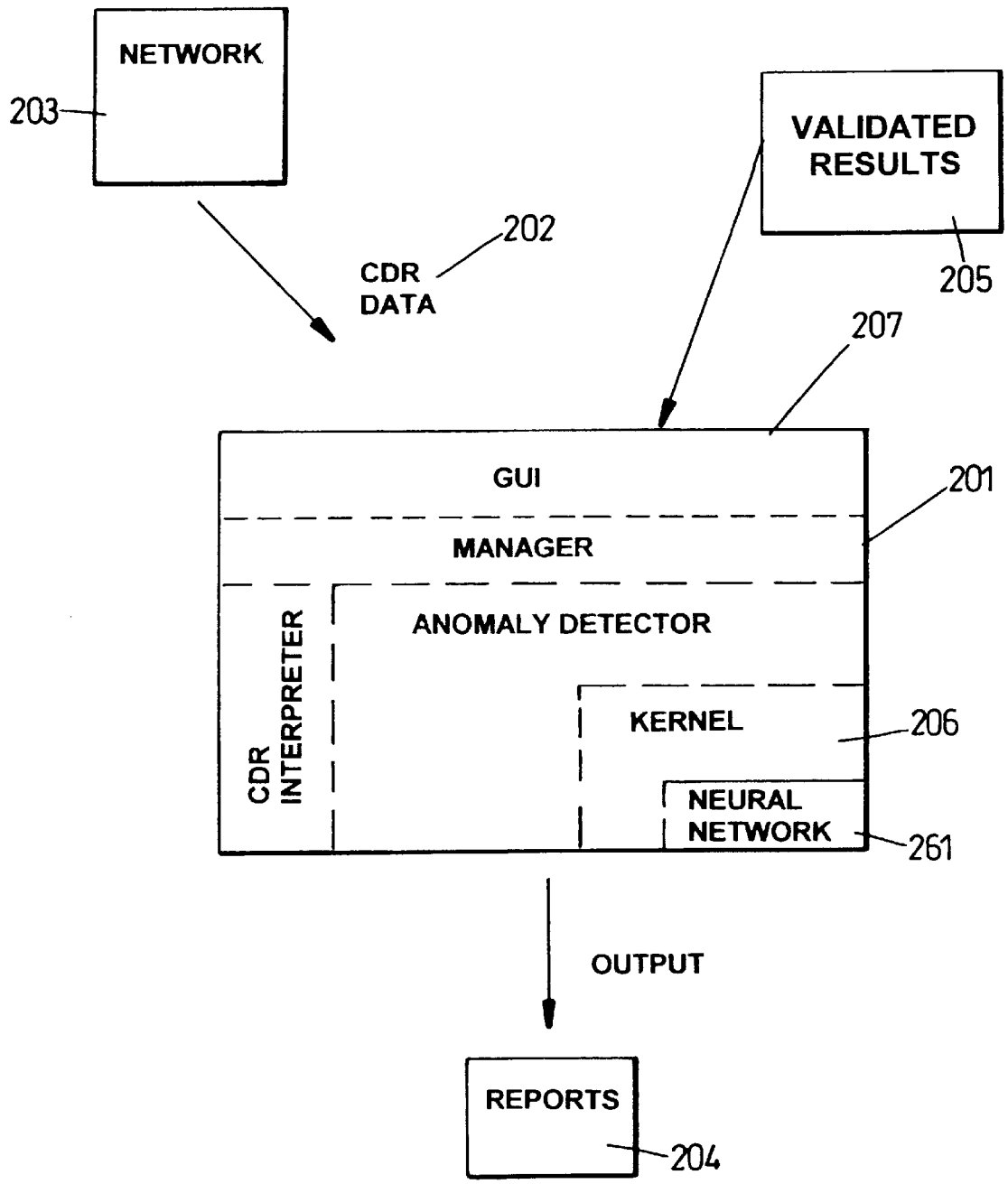
FIG. 14 is a general schematic diagram of an arrangement for the detection of anomalies in data relating to the transmission of messages in a communications network.

FIG. 14 shows schematically how the anomaly detector 201 can be used to receive information 202 about the transmission of messages in a communications network 203 and provide reports 204 about potential anomalies in the input data. Validated results 205 can be provided to the anomaly detector 201 so that the performance of the anomaly detector can be evaluated. For example, in the case of telecommunications fraud detection the anomaly detector 201 identifies potential fraud and non-fraud candidates. Further information 205 about whether these candidates have been correctly identified as frauds or non-frauds is then obtained for example from the user, and input to the anomaly detector. This information is used to evaluate the performance of the anomaly detector. This provides the advantage that a measure of the detector's performance can be obtained easily. Once the performance falls below a certain predefined level, action can be taken to improve the performance as long as certain other criteria are also met. This action involves retraining a neural network 261 which forms part of an anomaly detector kernel 206. Once the performance drops below a specified limit, retraining can be initiated automatically without any intervention from the user.

Figure 15:
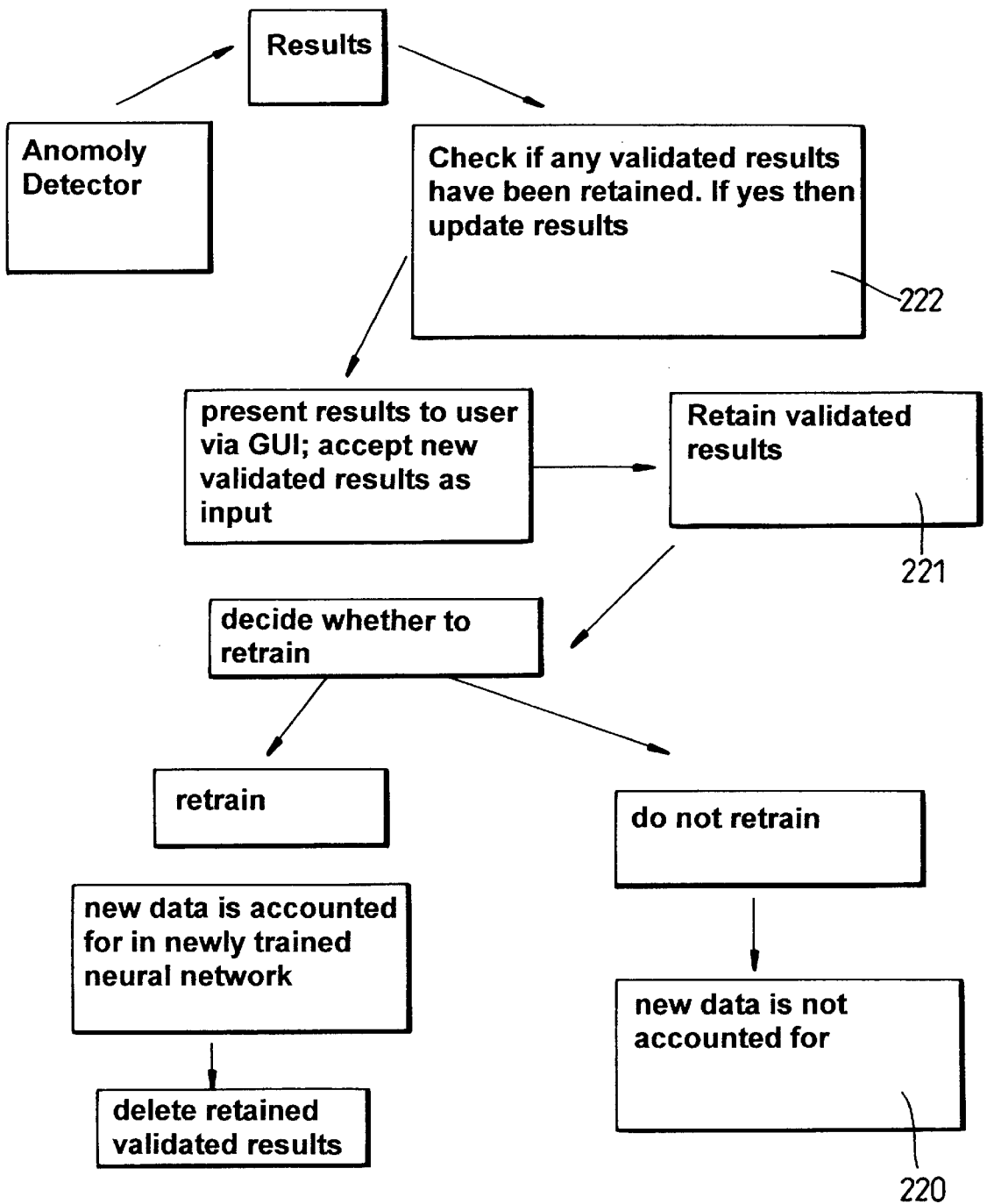
FIG. 15 is a flow diagram indicating how previously-validated candidates are retained.

In the situation where the performance of the anomaly detector 201 is satisfactory, no retaining takes place. This is illustrated in FIG. 15 at 220. In this situation validation data has been provided although the neural network 261 has not been updated using the validated data 205; that is, because the neural network 261 has not been retrained it is not able to take account of the new validation data 205. When further results are obtained from the anomaly detector 201, these will not reflect the new information and the user may be presented with results that she has already corrected before. In order to avoid this problem, the anomaly detector 201 is able to store validated results 221 between retraining episodes. This store of validated results is then used, as shown at 222, to update any further output from the anomaly detector before this is presented to the user for validation.

Figure 16:
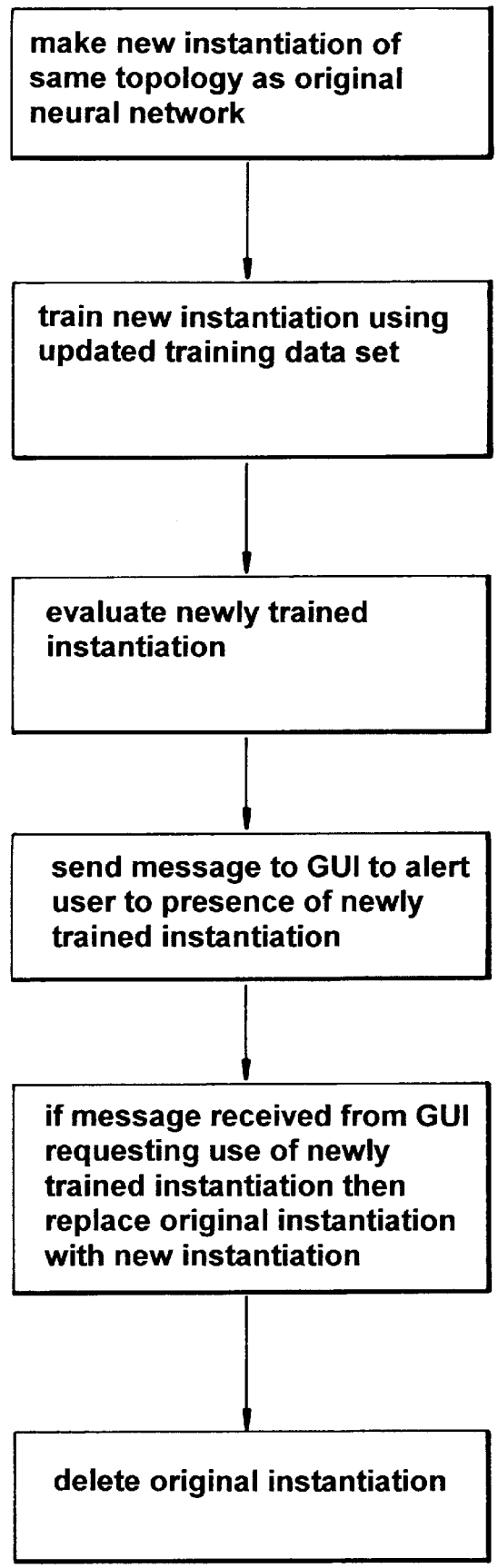
FIG. 16 is a flow diagram indicating how automatic retraining using a daughter neural network takes place.

The anomaly detector 201 also has the ability to create a daughter neural network of the same topology as the parent. This daughter can then be retrained whilst the parent is still in use. Once the daughter is retrained it can then be used in place of the parent, if the performance of the daughter is satisfactory. This is illustrated in FIG. 16.

It is not essential for the validation data 205 to be provided by a user via a user interface. For example, the validation data could be obtained automatically and input to the system directly. Also, it is not essential for the neural network to form part of an anomaly detector. The neural network could be used for processing data for another purpose.

The process of monitoring the performance of the anomaly detector will now be described in more detail. This comprises:
changing configuration information
performing an anomaly detection
presenting the outputs from the anomaly detector to the user via a user interface
accepting validated results or target outputs from the user via the user interface
evaluating the performance of the anomaly detector Changing Configuration Information The user is able to change the following settings during operation of the anomaly detector:
(i) the evaluation interval i.e. the number of sets of validated results that must be supplied to the anomaly detector before retraining can be initiated automatically;
(ii) the start date and time for performance of an anomaly detection;
(iii) the performance threshold i.e. the threshold below which performance of the anomaly detector must fall before automatic retraining is initiated. This step of changing the configuration information is optional.

Performing an Anomaly Detection

The kernel identifies via the system clock that a detection poll period has been reached. If the kernel is busy when a poll detection period is reached then when it becomes available it will get the current time. If this time is less than the clock interval (plus some overhead time) then the detection is serviced else the poll detection has been missed and the kernel sends a message back to the graphical user interface (GUI) to indicate that a poll detection has been missed.

If a detection is to take place then the kernel sends information to the GUI to indicate that the kernel cannot accept any further commands until the detection has been completed.

The kernel accepts input information that is input to the anomaly detector. This input information is initially in the form of call detail records for those customers who have made calls during the poll period. These call details records are pre-processed before being input to the kernel. The kernel also performs any further processing of the input information before this is provided as input to the neural network within the kernel. The neural network then performs the anomaly detection and outputs a set of results to the kernel. The kernel then stores these results in a file and sends information to the GUI indicating that the detection is complete.

Figure 18:
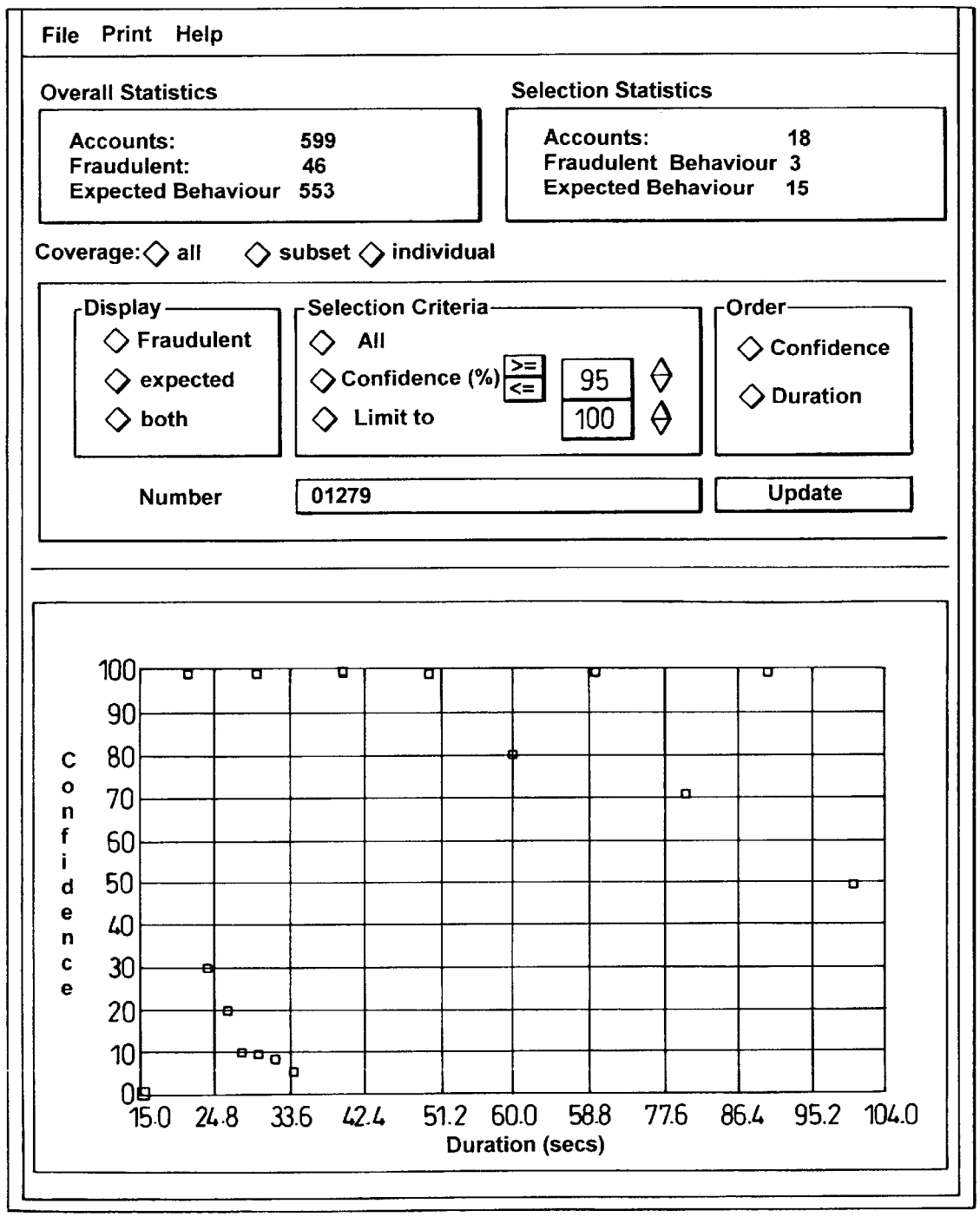
FIG. 18 shows another example display screen provided by the GUI.

Presenting the Outputs From the Anomaly Detector to the User Via a User-interface When the GUI receives information from the kernel indicating that a new detection results file has been created it indicates this to the user. This is done by highlighting a reload button on a display screen. By activating this button, for example by clicking it with a mouse, the user can display the results file on the screen. FIG. 17 shows an example of such a display. The user can manipulate the way in which the results are displayed using the user interface. The user is also able to generate a graph displaying the results information as shown in FIG. 18 and independently to change the viewing criteria for this graph without affecting the table of results.

Accepting Validated Results or Target Outputs From the User Via the User Interface When viewing the detection results on the table view as shown in FIG. 17, the user is able to indicate if individual responses were correct or incorrect. For example, the table 240 shown in FIG. 17 has one row 241 for each customer account number. In the various columns of the table 242 the following information is provided:

the customer account number; whether this account is identified as a potential fraud or not; the confidence rating of the fraud/non-fraud classification and the average duration of a telephone call. Other information could also be provided, for example the average duration of long distance calls or information about geographical location. The validity column 243 displays information that the user has input about the account number concerned. This information can be added to the kernel's knowledge base. The user is able to select individual accounts and validate the anomaly detector's response. When the user has added validation information for a number of accounts this can be added to the engine's knowledge base. This is done by activating the "add knowledge" button 244 on the user interface as shown in FIG. 17. When the user activates this button the GUI sends information to the kernel about the set of validated fraud candidates for all those accounts which have been validated and all other non-fraudulent accounts. This is called an add knowledge event.

When this information is sent to the kernel the kernel has several actions to perform as listed below:

(1) store or retain previously validated candidates;
(2) add information about the validated fraud candidates to the anomaly detector's knowledge base;
(3) update profiles;
(4) evaluate the performance of the anomaly detector;
(5) retrain the neural network.

Actions 1, 2 and 3 above must be performed whereas actions 4 and 5 are conditional.

Store or Retain Previously Validated Candidates

When an add knowledge event has been initiated, the GUI needs to maintain a list of all accounts which have been validated and the condition associated with that account, for example, whether a fraud was correctly identified as such. If subsequent detection take place before the kernel initiates automatic retraining then the GUI can display to the user what that account has been previously validated to.

Add Information About the Validated Fraud Candidates to the Anomaly Detector's Knowledge Base The kernel adds all the validated fraud candidates to the anomaly detector's knowledge base. The kernel also increments the number of add knowledge events which have been performed.

Update Profiles

The kernel updates the historical profile for those accounts which are validated as correct non-fraud candidates and those which are validated as incorrect fraud candidates. The kernel also updates the historical profiles for the other non-fraud candidates. The kernel matches the recent profiles with the customer's historical profile and then provides this information to another process which updates the historical profiles with the corresponding recent profiles. The updated historical profiles are then stored by the kernel.

Evaluate the Performance of the Anomaly Detector

If the number of add knowledge events is equal to the evaluation interval, the kernel performs an evaluation of the performance of the anomaly detector. If a performance evaluation is carried out then the counter for the number of add knowledge events is reset. The performance evaluation comprises carrying out a comparison of the candidates and any corresponding validation results.

Retrain the Neural Network

If the performance evaluation is less than the performance threshold, the kernel initiates retraining of the neural network. The kernel will not respond to any events that are sent until retraining is complete. No intervention by the user is required during retraining. The kernel informs the GUI when retraining is complete and which of the operations listed as 1–5 above have been performed so that the GUI can update its representations respectively. If an evaluation has taken place then the new performance evaluation result is sent to the GUI. If the neural network has been retrained, information about this is sent back to the GUI.

When retraining takes place, a new neural network is created by the kernel. This daughter neural network has the same topology as its parent. The daughter neural network is trained instead of retaining the parent.

Once retrained the daughter neural network is evaluated by the kernel. If the performance of the daughter is better than the parent then the kernel indicates to the GUI that a new neural network is available. The GUI asks the user if this new neural network should be used. The user's response is sent to the kernel and if affirmative, the kernel replaces the parent neural network with the daughter neural network.

Preferably the anomaly detector and the neural network are implemented using an object oriented programming language, or a non-introspective programming language. The anomaly detector is implemented using at least one instantiated object. In order to store or retain the objects persistence mechanisms are used. Such mechanisms are described in appendix B below. The objects or groups of linked objects are converted into data structures using the persistence mechanisms in order that they can be stored or retained. The data structures can then be passed between processors. For example, these may be different nodes on a communications network. This provides various advantages. For example, a daughter neural network, once created, can be stored as a data structure and moved to a quiet node in the communications network before being retrained. Also the neural network part of the anomaly detector can be moved to a particular node in the communications network whilst the other parts of the anomaly detector such as the GUI are held on a different (and perhaps quieter) node.

The anomaly detector discussed in the example above may also contain application specific software for storage of information relating to the transmission of messages in a communications network. A particular example of an anomaly detector which incorporates such application specific software is discussed below.

Figure 5:
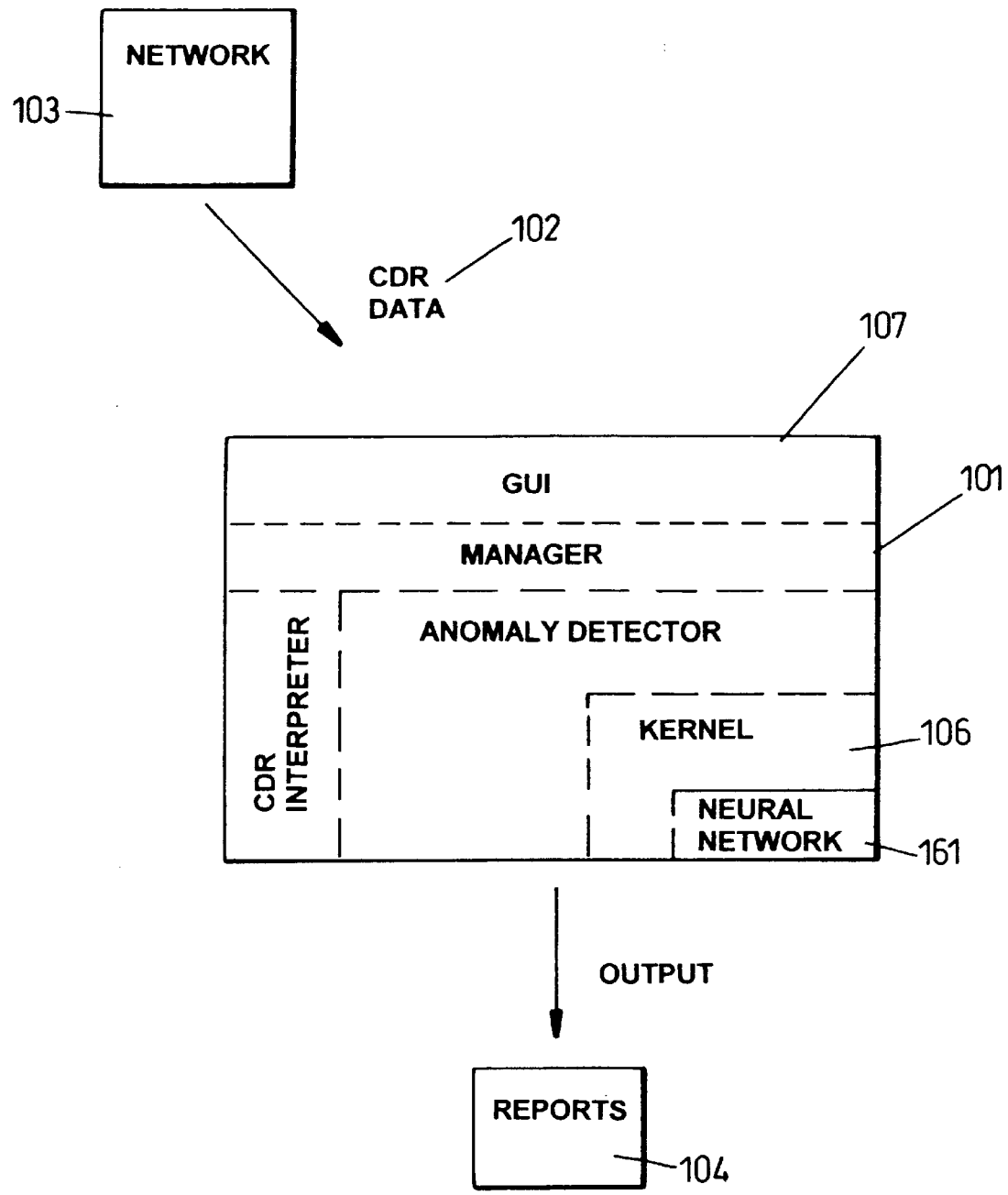
FIG. 5 is a general schematic diagram of an arrangement for the detection of anomalies in data relating to the transmission of messages in a communications network.
Figure 6:
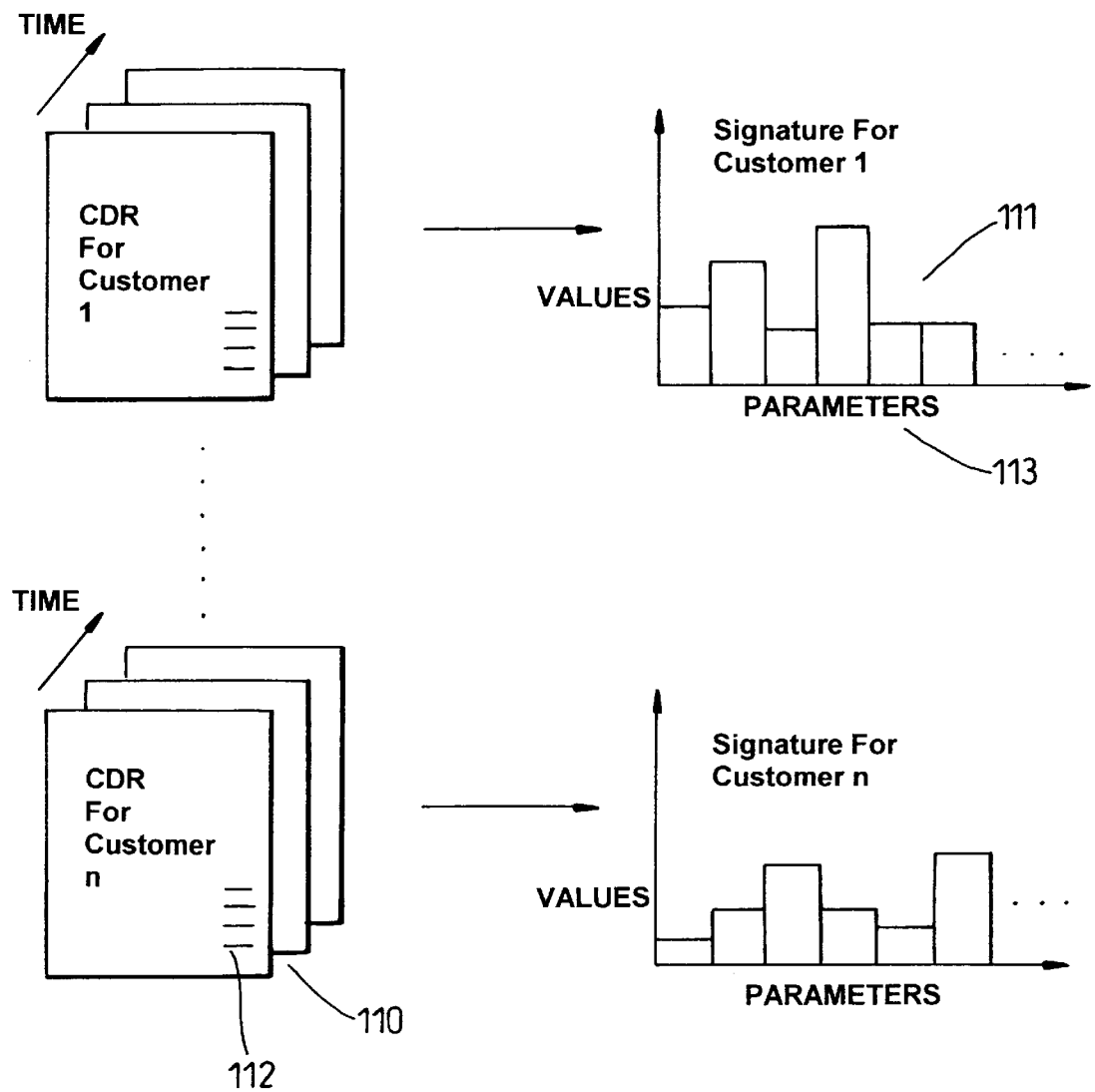
FIG. 6 is a general schematic diagram indicating how signatures are created.

FIG. 5 shows schematically how the anomaly detector 101 can be used to receive information 102 about the transmission of messages in a communications network 103 and provide reports 104 about potential anomalies in the input data. For example, in the case of a telecommunications network the information 102 can be in the form of call detail records (CDRs). The format of CDRs from different telecommunications systems differs and the anomaly detector is able to cope with this. In a given time period call detail records are obtained for telephone calls made during that time. The anomaly detector collects the individual CDR's for each customer and generates a signature for each customer. This is shown in FIG. 6. A set of CDR's for an individual customer is obtained 110. Each CDR comprises several attributes or fields 112 such as the billing account number; the telephone number associated with the account, the called telephone number, the date and time of completion of the call etc. From the set of CDR's for an individual customer 110 a signature 111 is created for that customer using information from the fields or attributes 112. Each signature 111 comprises several parameters 113 that are related to the fields or attributes 112 from the individual set of CDRs for the customer. For example, a parameter might be the percentage of local calls made during the time period. At least one parameter is related to the transmission of messages over a portion of the period and information relating to the position of the portion in the period. For example, such a parameter might be the percentage of local calls made between 8 am and 8 p.m. on the third day of the time period. This has the advantage that a large number of CDRs have been summarised into signatures that capture essential features of the pattern of telephone calls made by individual customers over time. By creating two signatures one for a long period of time and one for a shorter period of time, it is possible to capture information both about the macro behaviour relating to a particular account number and the micro behaviour relating to that account number. For example, an historic signature and a recent signature can be created with the historic signature reflecting behaviour over a longer period of time. By comparing the historic and recent signatures (for example using a neural network) recent changes in behaviour can be detected.

In the case when the historic and recent signatures are compared using a particular instantiation of a neural network the time periods for the historic and recent signatures, once these have been chosen, are fixed. The neural network is trained using historic and recent signatures with the chosen time periods and thereafter signatures with the same size of time period must be used.

Figure 7:
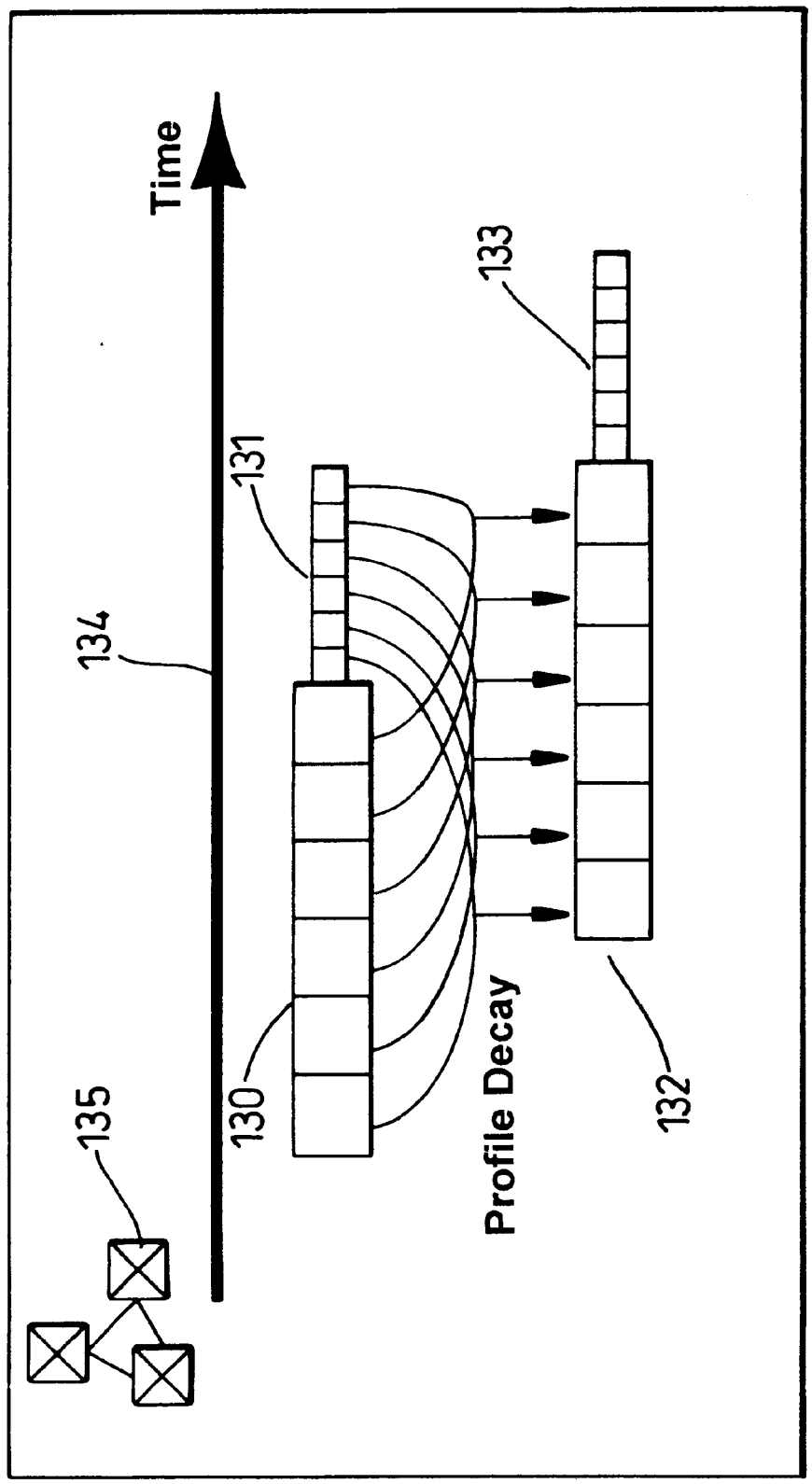
FIG. 7 is a general schematic diagram indicating the process of profile decay.
Figure 8:
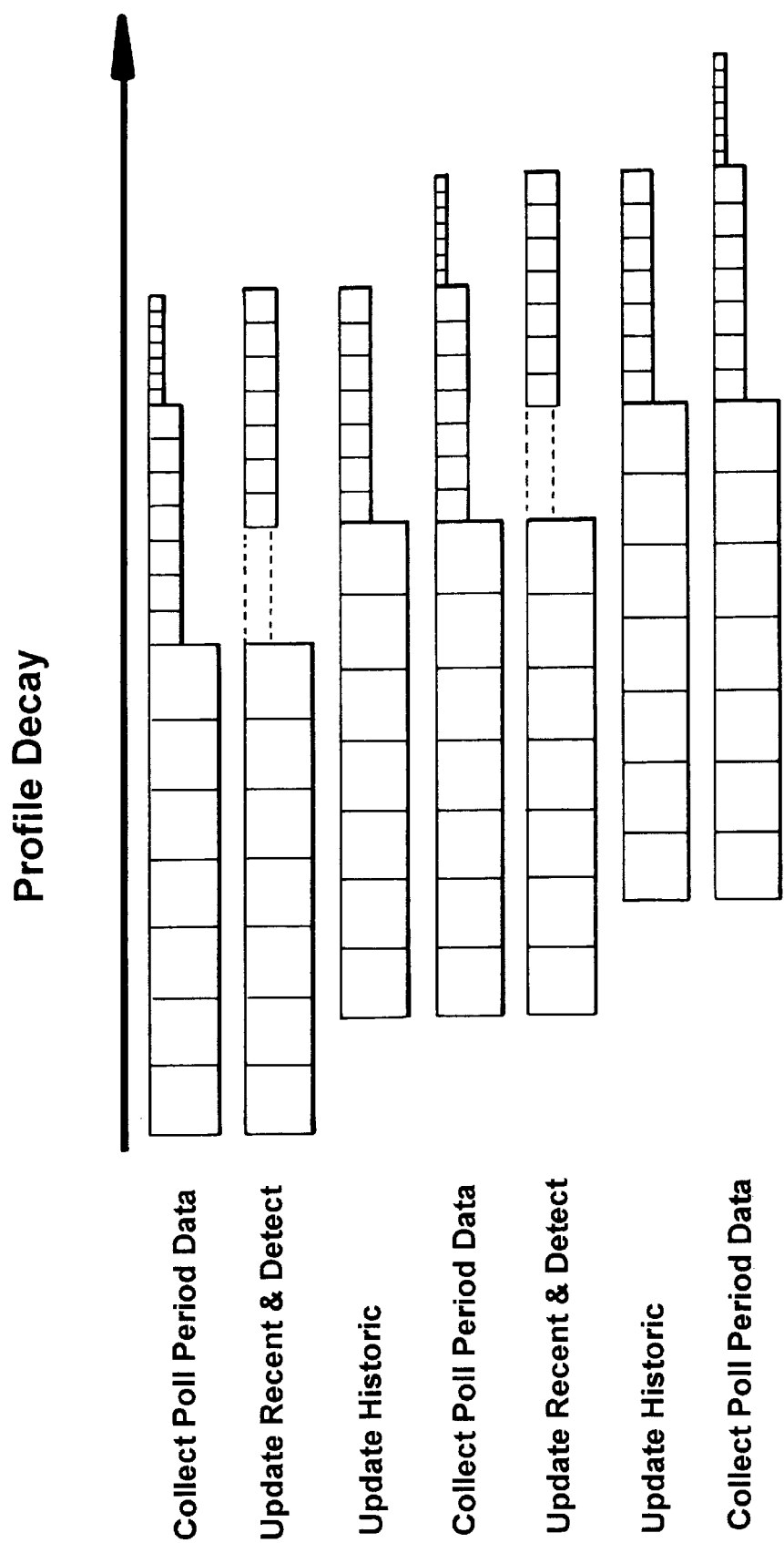
FIG. 8 is a general schematic diagram indicating the process of profile decay.

As time passes the historic signature needs to be updated because calling habits can change over time. This updating process enables emerging temporal patterns in the CDR data to be taken into account. The process of updating a signature is illustrated in FIGS. 7 and 8.

The current historic signature 130 is updated with the current recent signature 131 to form an updated historic signature 132. A new recent signature 133 can then be obtained. As indicated in FIG. 7 the current historic signature 130 is combined with the current recent signature 131 using a weighted averaging procedure to form the updated historic signature 132. The arrow 134 in FIG. 7 indicates time and the information emanating from the communications network over time is illustrated by 135.

In the situation where a comparison between an historic and a recent signature is required to detect anomalies it may be that new information has become available since the recent signature was created. For example, if the historic signature must always be updated using a recent signature that represents 7 days' worth of data then 6 days' worth of new information may be available before it is possible to take this into account. The system must wait until the end of the short recent period before an update is possible.

In order to accommodate new information obtained in-between updates a third dynamic signature is used. The third signature is dynamic because it can be taken over a variable time period as long as this is shorter than the time period for recent signatures. The dynamic third signature can then be used to update the recent signature before the anomaly detection takes place. This has the advantage that all available data is used in the anomaly detection process.

A signature which can also be referred to as a profile contains a statistical representation for each customer over a period of time. In one example, a profile as shown in FIG. 12 comprises the following major components:

n items representing the distribution of calls made during a week;

21 items representing the distribution of calls made during particular portions of a week;

of the 21 items 7 items represent the distribution of calls for each day of the week;

of the 21 items 14 represent the distribution of calls either for day time use or night time, for each day of the week.

The process of generating signatures from CDRs will now be described in more detail. This process comprises:

parsing a number of different formats of CDR file generating the profile.

Parsing a Number of Different Formats of CDR File

Figure 9:
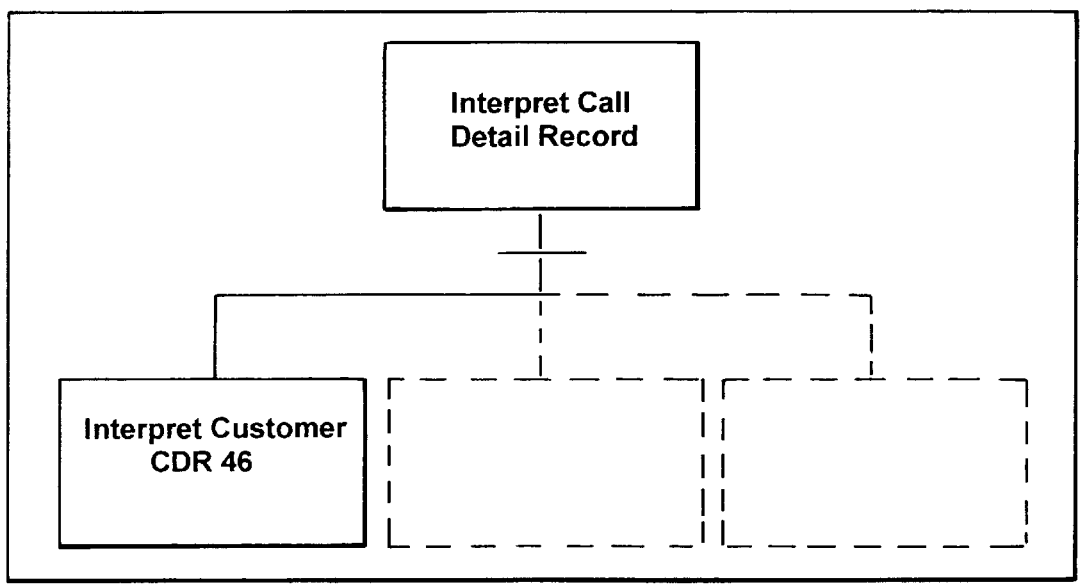
FIG. 9 is a general schematic diagram indicating the process whereby each new type of call detail record inherits from a base class.

This is done by defining a specification for the CDR type to be parsed. A parser for each type of CDR type is contained in a library of CDR parsers. A base class is created from which each new type of CDR is able to inherit as shown in FIG. 9.

Figures 11, 13:
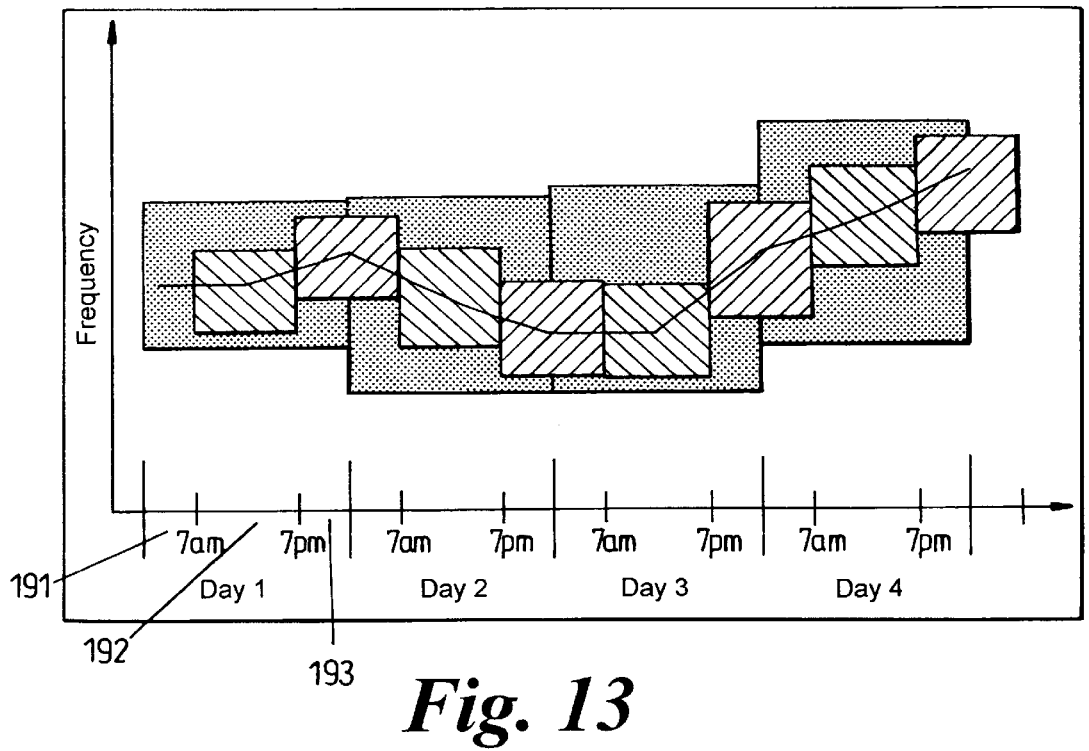
FIG. 11 shows an example of a target call detail record format.
FIG. 13 is a general schematic diagram indicating the different time periods used in calculating the day/night period.

For each CDR type which is to be parsed to create a profile a specification is built of the position of the important data and the format in which that data is stored within the CDR. An example of a CDR specification is shown in FIG. 10. The CDRs are then converted into the desired format using information from the CDR specification. An example of a desired or target call detail record format is shown in FIG. 11.

Generating the Profile

This involves selecting the appropriate attributes from each CDR (that has already been parsed into the desired format) to produce the profile. In this example, the desired CDR format is as shown in FIG. 11 and the profile has a basic structure as shown in FIG. 12. As previously described this contains 7 items for the basic structure 181 and 21 additional fields 182 which represent day-of-week and time-of-day information. Additional items can be added to this basic structure. Also, the 21 items 182 used within the profile shown in FIG. 12 can be expanded to model the time of day-of-week more closely. There is no restriction on the size of the profile which can be generated but the profile size must remain consistent within a particular instantiation of the system.

The appropriate attributes from each pre-parsed CDR are selected to form the profile by taking the following steps:

determining when a call was initiated calculating the call distribution over the week Determining When a Call Was Initiated In the example target CDR format shown in FIG. 11 there is a DayOf Week field 171. This is used to determine which day the call was made on. Similarly, the CallTime field 172 is used to determine the time the call was placed on that particular day.

Calculating the Call Distribution Over the Week

This is done by:

calculating the calls made each day;

and calculating the calls made in each day/night period.

Once the time when a call was initiated has been determined it is possible to create the elements of the profile which refer to the call distribution pattern i.e. the items shown at 182 in FIG. 12. Calls are analysed to calculate the percentage of calls made each day (7 items in the profile of FIG. 12) and also the percentage of calls made during the day/night periods (14 items in the profile of FIG. 12). This gives 21 items relating to the call distribution. In this example, all the percentages are based on the number of calls made in the respective period compared with the number of calls made over a whole week. Also, in this example, all the percentages are scoped between 0 and 1. For example, 15% would become 0.15.

Calculating the Calls Made Each Day

This is done by summing the number of calls made each day during the time period (in this case one week) and dividing this sum by the total number of calls made over the week. Information about the number of calls made each day is obtained using the DayofWeek field in the CDR, shown as 171 in FIG. 11.

Calculating the Calls Made in Each Day/Night Period

In this example, a night period is defined to include calls made between 7 pm one evening to 7 am the following day. Because a night period can therefore include calls made on separate days it is necessary to analyse which hour of the day the call is made and see which particular period a call should be classified in. Potentially, calls made over one day can fall into 3 different periods (91, 92 and 93) as shown in FIG. 13. The day of the week and the hour that the call was made are obtained. Then the number of calls made in the relevant period is divided by the number of calls made over the whole week to give the percentage of calls made in that period.

It is not essential that profiles of the form shown in FIG. 12 are used. Many other items could be included, for example the percentage of calls made to mobile telephones, the longest call made within the profile period and the number of call forwards made. Alternatively, the whole profile could be taken up with information about calls made at different times of the day. Many different combinations of different types of information are possible.

The process of updating a signature or profile is now described in more detail. As previously described, an historic signature is updated with the corresponding recent signature by a process involving a weighted averaging. A particular example of such an updating algorithm is given in the equation below:

$$T'i = (Ti - (Ti \times \text{UpdateFactor})) + (Si \times \text{UpdateFactor})$$

$$\text{UpdateFactor} = \frac{\text{Window Size}(S)}{\text{Window Size}(T)}$$

In this equation T is the target profile or signature, which in this case is the historic profile. S is the source profile which in this case is the recent profile. The term window size refers to the length of the time period to which the signature relates. For example, the source window size may be 1 hour and the target window size 10 hours. Once the target and source profiles have been obtained the update factor is calculated by dividing the source window size by the target window size. If the source window size is 1 hour and the target window size 10 hours then the update factor is 0.1. If no source or recent profile exists a new recent profile is created. If the number of attributes in a profile is 4 then example source and target profiles might be: S[1,2,3,4] and T[5,6,7,8]. T'1 which is the first attribute for the new target profile can then be calculated as follows: T'1=(5−(5×0.1))+(1×0.1)=4.6. Similarly, the other attributes for the new target profile are calculated. This updating process can also be used for updating a recent profile with a dynamic profile. In both cases, once the updating process has been completed, the more recent profile is removed.

It is not essential to use the exact updating algorithm as described in the equations above. Modifications of this algorithm are possible; any type of weighted averaging process can be used.

A recent profile can be updated with a third signature or poll profile in the same way as for an historic and recent profile. Alternatively a different updating algorithm can be used for the poll to recent update. For example, one possible preferred update rule for poll to recent updating is given below:

$$R' = k\left(P\frac{p}{q}\right) + (1-k)R = R + k\left(P\frac{p}{q} - R\right)$$

where p is the window size for the poll profile or third signature;

q is the previous normalising period;

P is the polled actual total (i.e. rate per r) . . . or average (i.e. rate per q); and R is the recent average (normalised to rate per q).

For a particular anomaly detector in which the method and apparatus for creating, storing and updating profiles or signatures is to be used then particular values for the time window sizes, the profile update rates and day-of-week dependencies must be chosen. Different values will be most suited to different applications. Some factors which need to be considered when choosing these values are given below:

Time Window Size

Setting the time window size too small may result in insufficient data to expect any reasonable response from the anomaly detector. Too small a time period may also result in the propagation of anomalous behaviour into the historical profile. If the recent time window size is too large the anomalous behaviour may go undetected for a longer period of time. In order to determine the best window sizes the effect of different sampling rates and the subsequent statistical representation of the characteristics of the behaviour being observed needs to be examined.

Profile Decay Rates

To determine the best profile decay rate an assessment of the importance of the historical behaviour relative to the recent behaviour need to be made.

Day-of-Week Dependencies

The process of determining the window sizes and the decay rates should also take into account the impact of the day-of-week dependencies.

A wide range of applications are within the scope of the invention. For example, detecting telecommunications fraud; detecting credit card fraud; early detection of faults in a communications network and encryption key management. The invention applies to any situation in which anomalies need to be detected in a large amount of time variant data.

A wide range of other applications are within the scope of the invention. These include situations in which information about both a macroscopic pattern of behaviour and a microscopic pattern of behaviour must be stored. For example, in the area of banking, the detection of credit card fraud involves the storage of information about macroscopic and microscopic patterns of credit card use. Other areas include computer network security, trends analysis and many other fields.

Applications in which stored information must be updated are also within the scope of the invention. These applications include situations where an emerging temporal pattern must be accounted for. For example, the detection of credit card fraud, computer network security mechanisms, trends analysis and many other fields.

A wide range of other applications which involve the use of a neural network are within the scope of the invention. For example, in the area of banking the neural networks can be used for detecting credit card fraud and in this situation the ability to automatically retrain and monitor the performance of the neural network is vital. Also, in the area of computer network security neural networks can play an important role in detecting anomalous behaviour. Any service which involves sending messages over a telecommunications network, including entertainment services such as games or video distribution could also benefit from anomaly detection or trends analysis. Neural networks are used in many other fields as well as anomaly detection. For example, speech recognition, pattern recognition and trends analysis. In any of these applications the ability to retrain the neural network without intervention from the user can be important and these applications fall within the scope of the invention.

Appendix A

Kernel

Major Components

This appendix details the major software components within the fraud detector application domain including analysis and design details required.

The following is a list of passive objects identified as part of the analysis phase which will now be described in more detail using the object numbers in parentheses:

Fraud Detection Client (27)

Interpret Call Detail Record (15)

Add Knowledge Request (23)

Update Historic Profile Request (24)

Performance Evaluation Request (29)
Fraud Detection Request (16)
Poll To Recent Profile Decay (20)
CDR To Profile Tranform (13)
Call Detail Record (12)
Unvalidated Fraud Candidates (25)
Fraud Detector Specification (28)
Validate Request (8)
Candidate Data Set (18)
Validated Fraud Candidate (22)
Fraud Candidate (11)
Presentation Data Set (17)
Fraud Candidate Data Set (21)
Profile Data Presentation (7)
Poll Profile Vector (4)
Recent Profile Vector (34)
Historic Profile Vector (33)

Fraud Detection Client (27)
Description

A representation of a client of a fraud detector. This controls the fraud detection and performance evaluation requests of the application C++ class name
  FDFraudDetectionClient Behaviour Description: CreateFraudKernel Upon receiving the CreateFraudKernel creation event from the GUI terminator, this object will:
  link to the specified fraud detector specification, object 28, which was passed as a parameter associated with the creation event.
  establish a clock polling mechanism.
  Read customer recent and historical profiles via the persistence mechanism (See Appendix B) creating a profile data presentation, object 7, for each individual customer and added to the presentation data set, object 17.
  The set of recent profiles is sent to construct poll to recent profile decay, object 20.
  A handle needs to be kept on both the presentation data set, object 17, and poll to recent profile decay, object 20.
  When the creation process is complete this object will send a KernelCreated event back to the GUI terminator.
  The fraud detection client is now ready to service other events.

Behaviour Description: UpdateEvaluationinterval

Upon receiving an UpdateEvaluationinterval event from the GUI terminator the client will modify the no_evaluation_period attribute of the Fraud Detector Specification object (28) with the new evaluation interval.

Behaviour Description: UpdateDetectionStartDate

Upon receiving an UpdateDetectionStartDate event from the GUI terminator the client will modify the detection_start attribute of the Fraud Detector Specification object (28) with the new date. The client will then stop and update the poll clock mechanism with the new detection time and restart the poll clock mechanism.

Behaviour Description: UpdatePerformanceThreshold

Upon receiving an UpdatePerformanceThreshold event from the GUI terminator the client will modify the evaluation_performance attribute of the Fraud Detector Specification object (28) with the new performance threshold.

Behaviour Description: AddKnowledge

Upon receiving an AddKnowledge event from the GUI terminator which contains a handle to a set of fraud candidate objects (11), the client will then create an AddKnowledgeRequest Object (23) with the associated fraud candidate set. On completion of the request the client will be informed by the AddKnowledgeRequest Object (23) what operations have been completed. These operations will be detailed by use of an enumeration parameter with an associated real value. The enumeration type contains the following:
  AddKnowledge
  PerformanceEvaluation
  Retraining If the enumeration value is "AddKnowledge" then the associated real value will be zero, else it will indicate the current performance of the ADE. These values will then be used to send a AddKnowledgeComplete event to GUI terminator.

Behaviour Description: SwitchEngine

Upon receiving a SwitchEngine event from the GUI terminator the client will interrogate the event parameter to establish if a switch is required. If a switch is required then a request will be made to the ADE to switch to a new anomaly detector. If a switch is not required then no request is made of the ADE. On completion of the switch process the client will send a SwitchComplete event to the GUI terminator.

Note: The client is required to control the persistence of the new ADE on completion.

Behaviour Description: PollTime

Upon receiving a PollTime event from the Process 10 (clock poll mechanism) terminator which indicates that a detection poll period has been reached. The client will send a DetectionTakingPlace to the GUI terminator to indicate that the client cannot except any events until the operation has been completed. The client will create a fraud detection request object (16) which will control the detection process. On completion the client will send a DectionResultsReady event to GUI terminator. This event includes the time stamp used to create the results file.

Note: If the kernel is busy when a poll detection period is reached then when the client becomes available it will get the current time. If this time is less than the clock interval (plus some overhead time) then the detection is serviced else the poll detection has been missed and the kernel sends a DetectionMissed message back to the GUI to indicate that a poll detection has been missed.

Methods
  FDFraudDetectionClient (FDFraudDetectorSpecification& fraud_spec)
  ~FDFraudDetectionClient( )
  static FDFraudDetectionClient* CreateFraudKernel (FDFraudDetectorSpecification& fraud_spec)
  void UpdateEvaluationinterval(int evaluation_interval)
  void UpdateDetectionStartDate(date detection_date)
  void UpdatePerformanceThreshold( float performance_threshold)
  void AddKnowledge(FDFraudCandidateDataSet& data_set)
  void SwitchEngine(Bool switch_required)
  void PollTime( )

Assumptions
  The bridge will create fraud detector specification object on CreateFraudKernel.
  The bridge will create fraud candidate date set object hierarchy on AddKnowledge.
  Retraining will always result in an improved performance of the ADE.
  Retraining can follow a retraining without a Switch-Engine event being received.
Ownership
  FDFraudDetectorSpecification
  FDAddKnowledgeRequest
  FDFraudDetectionfRequest
Read Accessors
  RWBoolean IsAnomalyDetectorCreated( ) const;
  FDPresentationDataSet* GetPresentationDataSet( ) const;
  RWBoolean GetADSwitched( ) const;
Write Accessors
  void SetADSwitched(RWBoolean state);
Interpret Call Detail Record (15)
Description
  The transformation that is required in order to interpret a comma separated CDR into a CDR.
  Note: Not implemented, absorbed into Validate Request (8).
Add Knowledge Request (23)
Description
  A request to add knowledge of fraud candidates.
C++ class name
  FDAddKnowledgeRequest
Behaviour Description
  Upon creation the add knowledge request object (23) is passed a fraud detection data set as a parameter. The object will:
    Sends an APP6AddKnowledge event to the ADE terminator including the set of example detection data presentations, object (9), contained within the specified data set. These should only include those account which have been validated (For more information see "Enumeration Types" on page 53.).
    Upon completion the ADE generates an APP14KnowledgeAdded, which contains a handle to the new knowledge set. This object must persist this information using the new_knowledge_filename.
    create a update historic profile request, object 24, attaching the specified data set.
    check if a performance update is required by interrogating the performance evaluation counter attribute of the fraud detection client, object (27), and determining if it equals the number of evaluations specified contained within the fraud detector specification, object (28). If a performance update is required then a performance evaluation request is created and the performance evaluation counter attribute is reset to zero. If a performance update is not required then the performance evaluation counter attribute is incremented.
  The operation enumeration is set to "AddKnowledge" as default.
Methods
  FDAddKnowledgeRequest(
  FDFraudCandidateDataSet& fraud_data_set,
  String new_knowledge_filename)
  ~FDAddKnowledgeRequest( )
Assumptions
  Update Historic Profile Request (24) will always be actioned after an Add Knowledge Request (23).
Ownership
  FDUpdateHistRequest
  FDPerformanceEvaluationRequest
Read Accessors
  No public read access methods are required by the object.
Write Accessors
  No public write access methods are required by the object
Update Historic Profile Request (24)
Description
  A request to update historic profiles.
C++ class name
  FDUpdateHistRequest
Behaviour Description
  Upon creation the update historic profile request is passed a fraud detection data set as a parameter. This object will:
    Sends an APP7UpdateHistoricProfiles event to the ADE terminator including the set of profile data presentations. Only those validated fraud candidates with a validation category of either; correct non-fraudulent or incorrect fraud candidates. In addition all the other non-fraud candidates are passed to the ADE.
    Upon completion the ADE generates an APP15ProfilesUpdated, the event contains the updated profiles. The update historic profiles request then needs to persist all the updated historical profiles. This data set can then be removed.
Methods
  FDUpdateHistRequest(
  FDFraudCandidateDataSet& fraud_data_set,
  String historic_profile_filename)
  ~FDUpdateHistRequest( )
Assumptions
  None.
Ownership
Read Accessors
  No public read access methods are required by the object.
Write Accessors
  No public write access methods are required by the object
Performance Evaluation Request (29)
Description
  A request to evaluate the performance of the fraud detector application.
C++ class name
  FDPerformanceEvaluationRequest
Behaviour Description
  No parameters are sent on construction of this object. This object will:
    Sends an APP3EvaluatePerformance event to the ADE. Upon completion the ADE generates an APP11PerformanceResultsObtained event with the ADE current performance.
    If the resulting performance evaluation is less than the evaluation threshold attribute of the fraud detector specification then the performance evaluation request sends an APP4TrainAD event to the ADE. Upon completion the ADE generates an APP12AnomalyDetectorTrained with the a new performance from the ADE.
    The operation enumeration type object attribute of the add knowledge request needs to be set to either "PerformanceEvaluation" or "Retraining" to indicate which operation has been performed.
    The new performance is returned to the add knowledge request object.
Methods
  FDPerformanceEvaluationRequest( )
  ~FDPerformanceEvaluationRequest( )
Assumptions
  None.
Ownership Read Accessors
No public read access methods are required by the object.
Write Accessors
No public write access methods are required by the object
Fraud Detection Request (16)
Description
A request to perform a detection of fraud on a presentation data set. The resultant fraud candidates are contained in the associated candidate data set.
C++ class name
FDFraudDetectionRequest
Behaviour Description
Upon creation the fraud detection request is passed a presentation data set as a parameter. This object will:
  Creates CDR to profile tranform, object 13, with csv filename and poll detection period.
  CDR to profile tranform, object 13, returns a list of poll detection profiles, object 4.
  Creates fraud candidate, object 11, to be populated with the results from the ADE.
  Sends an APP2PerformDetection event to the ADE terminator, with profile data presentations, object 7, where the profile modified attribute is true.
  Once the ADE has completed the detection event the ADE generates an APP10DetectionComplete. The fraud candidate, object 11 is populated with candidate presentations, object 6, matching with the associated recent profile, object 4.
  The profile modified attribute within profile data presentation, object 7, for all those sent to the ADE terminator need to be set back to false.
  The fraud candidate, object 11, persistence mechanism to write the results to a file. The time stamp at time of creation of this file needs to added to the top of the file and maintained to be sent back to the client, object 27.
  Once the results file has been created the fraud candidate, object 11, can be removed.
CDR Extraction, Poll Profile Creation and Search Algorithm
while(not end_of_file)
{
Read(next_line_of_file)
cdr=CreateCDR(next_line_of_file)
if(account_no!=cdr.account_no)
poll$_{13}$ profile=CreatePollProfile(cdr)
else
poll_profile=AccumulatePollProfile(cdr)
account_no=cdr.account_no
DecayRecent(poll_profile)
DeletePollProfile(poll_profile)
}
Note: Assumption that the CDR file is sorted by account number. Decay profile will provide a binary search technique to locate the recent profile.
Methods
FDFraudDetectionRequest(
FDPresentationDataSet& presentation_data_set
FDPollToRecentProfileDecay& profile_decay
String results_filename,
String csv_filename
Time poll_detection_period
Time recent_profile_period)
~FDFraudDetectionRequest( )
Assumptions
None.
Ownership
Read Accessors No public read access methods are required by the object.
Write Accessors
No public write access methods are required by the object
Poll To Recent Profile Decay (20)
Description
The decay transform for decaying a poll period profile into a recent profile.
C++ class name
FDPollToRecentProfileDecay
Behaviour Description
Upon creation this object is given recent profile vectors object (4). This object will:
  Create relationships to all recent profiles.
  Calculate update factor using poll detection period for source and recent profile period for target.
  Upon a DecayProfile event search for the corresponding recent profile. If no recent profile exists create new recent profile.
  Update the target profiles behaviour with the source target behaviour using the algorithm below.
  Once the recent profile has been updated the poll detection profile can be removed.
  Modifies the profile modified attribute within the associated profile data presentation, object 7, to true.
Methods
FDPollToRecentProfileDecay(
RWTPtrDlist<FDRecentProfileVector>& recent_profile,
Time poll_detection_period,
Time recent_profile_period)
~FDPollToRecentProfileDecay( )
void DecayProfile(FDProfileVector& poll_profile)
Assumptions
None.
Updating profiles algorithm $$T_i'=(T_i-(T_i x \text{UppdateFactor}))+(S_i x \text{UpdateFactor})$$

For all i Where T is the target profile (e.g. recent profile) and S is the source profile (e.g. poll detection period profile.)

$$\text{UpdateFactor} = \frac{\text{Window Size}(S)}{\text{Window Size}(T)}$$

Read Accessors
No public read access methods are required by the passive object.
Write Accessors
No public write access methods are required by the passive object
CDR To Profile Tranform (13)
Description
A request to perform a detection of fraud on a presentation data set. The resultant fraud candidates are contained in the associated candidate data set.
C++ class name
FDCDRProfileTranform
Behaviour Description
Upon creation CDR profile transform. This object will:
  For each call detail record, object 12, this object either constructs a poll profile, object 4, or updates the existing poll profile.
  This object sends the poll detection profile to poll to recent profile decay, object 20, with poll detection period and recent profile period.
Methods
FDCDRProfileTranform( String csv_filename,
int poll_detection_period)
~FDCDRProfileTranform( )
Assumptions
Operates on an ordered input file.
Ownership
FDProfileVector (Poll detection profiles only).
Read Accessors
No public read access methods are required by the passive object.
Write Accessors
No public write access methods are required by the passive object
Call Detail Record (12)
Description
A software representation of a telecommunication call detail record.
C++ class name
FDCallDetailRecord
Methods
FDCallDetailRecord(String csv_filename)
~FDCallDetailRecord( )
FDCallDetailRecord ReadCallDetailRecord( )
Assumptions
The source CDR file is ordered by account number.
Ownership
Read Accessors
Write Accessors
Unvalidated Fraud Candidates (25)
Description
An unvalidated association of a customers recent profile and the results of a detection process.
C++ class name
FDUnvalidatedFraudCandidates
Inheritance
FDFraudCandidate
Methods
FDUnvalidatedFraudCandidates(
FDProfileVector& recent_profile,
ADCandidatePresentation& candidate_presentation)
~FDUnvalidatedFraudCandidates( )
Assumptions
None.
Ownership
None.
Read Accessors
No public read access methods are required by the passive object.
Write Accessors
No public write access methods are required by the passive object
Fraud Detector Specification (28)
Description
The specification of the fraud detector application.
C++ class name
FDFraudDetectorSpecification
Methods
FDFraudDetectorSpecification(String Default_results_filename
String csv_filename
String recent_profile_filename
String historical_profile_filename
String ade_spec_filename
Date detection_start
int evaluation_interval
int evaluation_counter
int performance_threshold
int recent_window_size
int historical_window_size
int detection_time_interval
int input_size
int recent_size)
~FDFraudDetectorSpecification( )
Assumptions
None.
Ownership
None.
Read Accessors
StringGetDefaultResultsFilename(
default_results_filename)
String GetCSVFilename(csv_filename)
String GetRecentProfileFilename(
recent_profile_filename)
String GetHistoricalProfileFilename(
historical_profile_filename)
String GetADESpecFilename (ade_spec_filename
Date GetDetectionStart(detection_start)
int GetEvaluationlnterval(evaluation_interval)
int GetEvaluationCounter(evaluation_counter)
int GetPerformanceThreshold(performance_threshold)
int GetHistoricalWindowSize(historical_window_size)
int GetRecentWindowSize(recent_window_size)
int GetDetectionTimeInterval(detection_time_interval)
int GetinputSize(input_size)
int GetRecentSize(recent_size)
Write Accessors
void SetDefaultResultsFilename(String default_results_filename)
void SetCSVFilename(String csv_filename)
void SetRecentProfileFilename(String recent_profile_filename)
void SetHistoricalProfileFilename(String historical_profile_filename)
void SetADESpecFilename (String ade_spec_filename
void SetDetectionStart(Date detection_start)
void SetEvaluationinterval(int evaluation_interval)
void SetEvaluationCounter(int evaluation_counter)
void SetPerformanceThreshold(int performance_threshold)
void SetHistoricalWindowSize(int historical_window_size)
void SetRecentWindowSize(int recent_window_size)
void SetDetectionTimeInterval(int detection_time_interval)
void SetInputSize(int input_size)
void SetRecentSize(int recent_size)
Validate Request (8)
Description
A request to create a validated set of fraud candidates.
Note: Not implemented, absorbed into Fraud Detection Request (16).
Candidate Data Set (18)
Description
A set of candidate presentations.
C++ class name
FDCandidateDataSet
Methods
FDCandidateDataSet(
RWTPtrDlist<ADCandidatePresentation>
&candidate_presentation_ids)
~FDCandidateDataSet( )
Assumptions
Ownership
Read Accessors
int GetNumberOfPresentations( ) const;

Write Accessors
void SetNumberOfPresentations(int number_of_presentations);
Validated Fraud Candidate (22)
Description
An association of a customers recent profile and the validated results of a detection process.
C++ class name
FDValidatedFraudCandidate
Inheritance
FDFraudCandidate
Methods
FDValidatedFraudCandidate(
FDProfileVector& recent_profile,
NNExampleDataPresentation& example_presentation);
~FDValidatedFraudCandidate( )
Enumeration Types
enum ValidationStatus
{
UNVALIDATED,
CORRECT_FRAUD,
INCORRECT_FRAUD,
CORRECT_NONFRAUD,
INCORRECT_NON_FRAUD
}
Assumptions
None.
Ownership
Read Accessors
ValidationStatus GetValidationCategory( ) const;
Write Accessors
void SetValidationCategory(ValidationStatus validation_category);
Fraud Candidate (11)
Description
An association of a customers recent profile and the results of a detection process, (either validated or unvalidated).
C++ class name
FDFraudCandidate
Methods
FDFraudCandidate(FDProfileVector& recent_profile)
~FDFraudCandidate( )
Assumptions
Ownership
Read Accessors
No public read access methods are required by the passive object.
Write Accessors
No public write access methods are required by the passive object
Presentation Data Set (17)
Description
A set of profile data presentations.
C++ class name
FDPresentationDataSet
Methods
FDPresentationDataSet(FDProfileDataPresentation& profile_data_presentation_id)
FDPresentationDataSet(
RWTPtrDlist<FDProfileDataPresentation>& profile_data_presentation_ids)
~FDPresentationDataSet( )
Assumptions
Ownership
Read Accessors
int GetNumberOfPresentations( ) const;
Write Accessors
void SetNumberOfPresentations(int number_of_presentations);
Fraud Candidate Data Set (21)
Description
A container of fraud candidates.
C++ class name
FDFraudCandidateDataSet
Methods
FDFraudCandidateDataSet( )
~FDFraudCandidateDataSet( )
Assumptions
Ownership
Read Accessors
int GetNumberOfPresentations( ) const;
Write Accessors
void SetNumberOfPresentations(int number_of_presentations);
Profile Data Presentation (7)
Description
Combination of a historic and a recent profile data vector.
C++ class name
FDProfileDataPresentation
Behaviour Description
Each recent profile is matched with it respective historical profiles and sent to the ADE. This representation is used for both detection (object 16) and profile decay (object 24).
Methods
FDProfileDataPresentation(
FDProfileVector& recent_profile,
FDProfileVector historical_profile)
FDProfileDataPresentation(
FDProfileVector& recent_profile,
RWTPtrDlist<FDProfileVector>& historical_profile)
~FDProfileDataPresentation( )
Assumptions
None.
Ownership
Read Accessors
Bool GetProfileModified( ) const;
Write Accessors
void SetProfileModified(Bool profile_modified);
Poll Profile Vector (4)
Description
Describes the structure of a profile data vector.
C++ class name
FDPollProfileVector
Inheritance
NNVector
Methods
FDPollProfileVector(String account_number,
FDCallDetailRecord& call_detail_record)
~FDPollProfileVector( )
Assumptions
Ownership
Read Accessors
String GetAccountNumber( ) const;
Write Accessors
void SetAccountNumber(String account_number);
Recent Profile Vector (34)
Description
Describes the structure of a recent profile data vector.
C++ class name
FDRecentProfileVector
Inheritance
ADRecentProfileVector
Behaviour Description After the poll profiles have been used to update the recent profile, the updated recent profiles then needs to be persisted to the recent profile file using the persistence mechanism.

Methods
FDRecentProfileVector(String account_number, NNVector& data_vector)
~FDRecentProfileVector( )
Persist(String recent_profile_filename)
Assumptions
Ownership
Read Accessors
String GetAccountNumber( ) const;
Write Accessors
void SetAccountNumber(String account_number);
Historic Profile Vector (33)
Description
Describes the structure of a profile data vector.
C++ class name
FDHistoricProfileVector
Inheritance
ADHistoricalProfileVector
Methods
FDHistoricProfileVector(String account_number, NNVector& data_vector)
~FDHistoricProfileVector( )
Assumptions
Ownership
Read Accessors
String GetAccountNumber( ) const;
Write Accessors
void SetAccountNumber(String account_number);

Appendix B:

Persistence
Overview

Tools.h++ version 7.0 Users Guide, 1996, Rogue Wave Software, defines that a object can have one of four levels of persistence:

No persistence. There is no mechanism for storage and retrieval of the object.

Simple persistence. A level of persistence that provides storage and retrieval of individual objects to and from a stream or file. Simple persistence does not preserve pointer relationships among the persisted objects.

Isomorphic persistence. A level of persistence that preserves the pointer relationships among the persisted objects.

Polymorphic persistence. The highest level of persistence. Polymorphic persistence preserves pointer relationships among the persisted objects and allows the restoring process to restore an object without prior knowledge of that object's type.

This appendix provides information about the use of Isomorphic persistence through descriptions, examples, and procedures for designing persistent classes. To implement other levels of persistence it is recommended that the reader consult the relevant Tools.h++ manual pages.

Persistence Mechanism

Isomorphic persistence is the storage and retrieval of objects to and from a stream such that the pointer relationships between the objects are preserved. If there are no pointer relationships, isomorphic persistence effectively saves and restores objects the same way as simple persistence. When a collection is isomorphically persisted, all objects within that collection are assumed to have the same type.

The isomorphic persistence mechanism uses a table to keep track of pointers it has saved. When the isomorphic persistence mechanism encounters a pointer to an unsaved object, it copies the object data, saves that object data NOT the pointer to the stream, then keeps track of the pointer in the save table. If the isomorphic persistence mechanism later encounters a pointer to the same object, instead of copying and saving the object data, the mechanism saves the save table's reference to the pointer.

When the isomorphic persistence mechanism restores pointers to objects from the stream, the mechanism uses a restore table to reverse the process. When the isomorphic persistence mechanism encounters a pointer to an unrestored object, it recreates the object with data from the stream, then changes the restored pointer to point to the recreated object. The mechanism keeps track of the pointer in the restore table. If the isomorphic persistence mechanism later encounters a reference to an already-restored pointer, then the mechanism looks up the reference in the restore table, and updates the restored pointer to point to the object referred to in the table.

Class Requirements For Persistence

To create a class that supports isomorphic persistence the class must meet the following requirements.

The class must have appropriate default and copy constructors defined or generated by the compiler:
PClass( ); //default constructor
PClass(T& t);//copy constructor The class must have an assignment operator defined as a member OR as a global function:
PClass& operator=(const PClass& pc);//member function
PClass& operator=(PClass& lhs, const PClass& rhs);//global function The class cannot have any non-type template parameters. For example, in RWTBitVec<size>, "size" is placeholder for a value rather than a type. No present compiler accepts function templates with non-type template parameters, and the global functions used to implement isomorphic persistence (rwRestoreGuts and RWSaveGuts) are function templates when they are used to persist templatized classes.

All the data necessary to recreate an instance of the class must be globally available (have accessor functions).

Creating a Persistent Class

To create an isomorphically persistent class or to add isomorphic persistence to an existing class, follow these steps:

1. Make all necessary class data available.
2. Add RWDECLARE_PERSISTABLE to your header file.
include<rw/edefs.h>
RWDECLARE_PERSISTABLE(YourClass)
3. Add RWDEFINE_PERSISTABLE to one source file.
include<rw/epersist.h>
RWDEFINE_PERSISTABLE(YourClass)
4. Define rwSaveGuts and rwRestoreGuts. Methods rwSaveGuts and rwRestoreGuts will be used to save and restore the internal state of the class. These methods are called by the operator<< and operator>> that were declared and defined by the macros in 2 & 3.

For non-templatized classes, define the following functions:
void rwSaveGuts(RWFile& f, const YourClass& t){/*_*/}
void rwSaveGuts(RWvostream& s, const YourClass& t) {/*_*/}
void rwRestoreGuts(RWFile& f, YourClass& t) {/*_*/}
void rwRestoreGuts(RWvistream& s, YourClass& t) {/*_*/}

For templatized classes with a single template parameter T, define the following functions:

```
template<class T>void
rwSaveGuts(RWFile& f, const YourClass<T>& t){/*_*/}
template<class T>void
rwSaveGuts(RWvostream& s, const YourClass<T>& t)
    {/*_*/}
template<class T>void
rwRestoreGuts(RWFile& f, YourClass<T>& t) {/*_*/}
template<class T>void
rwRestoreGuts(RWvistream& s, YourClass<T>& t) {/*_
    */}
```

For templatized classes with more than one template parameter, define rwRestoreGuts and rwSaveGuts with the appropriate number of template parameters.

Function rwSaveGuts saves the state of each class member necessary persistence to an RWvostream or an RWFile. If the members of your class can be persisted and if the necessary class members are accessible to rwSaveGuts, you can use operator<< to save the class members.

Function rwRestoreGuts restores the state of each class member necessary for persistence from an RWvistream or an RWFile. Provided that the members of your class are types that can be persisted, and provided that the members of your class are accessible to rwRestoreGuts, you can use operator>> to restore the class members.

Example of a Persistent Class
PClass Header File
include<rw/cstring.h>
include<rw/edefs.h>
include<rw/rwfile.h>
include<rw/epersist.h>

```
class PClass
{
    public:
        PClass ();
        PClass (const RWCString& string_attribute,
                int int_attribute,
                float float_attribute,
                PClass* ptr_to_attribute);
        ~PClass();
        //Persistance operations
        friend void rwRestoreGuts(RWvistream& is, PClass& obj);
        friend void rwRestoreGuts(RWFile& file, PClass& obj);
        friend void rwSaveGuts(RWvostream& os, const PClass& obj);
        friend void rwSaveGuts(RWFile& file, const PClass& obj);
        //Stream operations
        friend ostream& operator<<(ostream& os, const PClass& obj);
    private:
        RWCString   StringAttribute;
        int         IntAttribute;
        float       FloatAttribute;
        PClass*     PtrToAttribute;
};
RWDECLARE_PERSISTABLE(PClass)
PClass Implementation File
#include <PClass.H>
PClass::PClass()
{
    IntAttribute = 0;
    FloatAttribute = 0;
    PtrToAttribute = 0;
}
PClass::PClass(const RWCString& string_attribute,
                int int_attribute,
                float float_attribute,
                PClass* ptr_to_attribute)
{
    StringAttribute = string_attribute;
    IntAttribute = int_attribute;
    FloatAttribute = float_attribute;
    PtrToAttribute = ptr_to_attribute;
}
PClass::~PClass()
{
}
RWDEFINE_PERSISTABLE(PClass)
void rwRestoreGuts(RWvistream& is, PClass& obj)
{
    is>>obj.StringAttribute;    //Restore String.
    is>>obj.IntAttribute;       //Restore Int.
    is>>obj.FloatAttribute;     //Restore Float.
    RWBoolean ptr;
    is>>ptr;
    if (ptr)
    {
            is>>obj.PtrToAttribute;
    }
}
void rwRestoreGuts(RWFile& file, PClass& obj)
{
    file>>obj.StringAttribute;  //Restore String.
    file>>obj.IntAttribute;     //Restore Int.
    file>>obj.FloatAttribute;   //Restore Float.
    RWBoolean ptr;
    file>>ptr;
    if (ptr)
    {
            file>>obj.PtrToAttribute;
    }
}
void rwSaveGuts(RWvostream& os, const PClass& obj)
{
    os<<obj.StringAttribute;    //Save String.
    os<<obj.IntAttribute;       //Save Int.
    os<<obj.FloatAttribute;     //Save Float.
    if (obj.PtrToAttribute==rwnil)
    {
        os<<FALSE;              //No pointer.
    }
    else
    {
        os<<TRUE;               //Save Pointer
        os<<*(obj.PtrToAttribute);
    }
}
void rwSaveGuts(RWFile& file, const PClass& obj)
{
    file<<obj.StringAttribute;  //Save String.
    file<<obj.IntAttribute;     //Save Int.
    file<<obj.FloatAttribute;   //Save Float.
    if (obj.PtrToAttribute==rwnil)
    {
        file<<FALSE;            //No pointer.
    }
    else
    {
        file<<TRUE;             //Save Pointer
        file<<*(obj.PtrToAttribute);
    }
}
ostream& operator<<(ostream& os, const PClass& obj)
{
    os<<" StringAttribute:"
        <<obj.StringAttribute<<" ";
    os<<"IntAttribute:"
        <<obj.IntAttribute<<" u";
    os<<"FloatAttribute:"
        <<obj.FloatAttribute<<" ";
    os<<"PtrToAttribute:"
        <<(void*)obj.PtrToAttribute<<" ";
    if(obj.PtrToAttribute)
    {
        os<<"Value at Pointer:"
            <<*(obj.PtrToAttribute)<<" ";
    }
    return os;
}
Use of PClass
#include <iostream.h>
```

-continued

```
#include <PClass.H>
void main()
{
    //Create object that will be pointed to by
    //persistent object.
    RWCString s1("persist_pointer_object");
    PClass persist_pointer_object(s1, 1, 1.0, 0);
    RWCString s2("persist_class1");
    PClass persist_class1(s2, 2, 2.0, &persist_pointer_object);
    cout<<"persist_class1 (before save):"<<endl
        <<persist_class1<<endl<<endl;
    //Save object in file "test.dat".
    RWFile file("test.dat");
    file<<persist_class1;
    PClass persist_class2;
    //Restore object from file "test.dat".
    {
    RWFIle file("test.dat");
    file>>persist_class2;
    }
    cout<<"persist_class2 (after restore):"<<endl
        <<persist_class2<<endl<<endl;
}
```

Special Care with Persistence

The persistence mechanism is a useful quality, but requires care in some areas. Here are a few things to look out for when using persist classes.

1. Always Save an Object by Value before Saving the Identical Object by Pointer.

In the case of both isomorphic and polymorphic persistence of objects, never stream out an object by pointer before streaming out the identical object by value. Whenever designing a class that contains a value and a pointer to that value, the saveGuts and restoreGuts member functions for that class should always save or restore the value then the pointer.

2. Don't Save Distinct Objects with the Same Address.

Be careful not to isomorphically save distinct objects that may have the same address. The internal tables that are used in isomorphic and polymorphic persistence use the address of an object to determine whether or not an object has already been saved.

3. Don't Use Sorted RWCollections to Store Heterogeneous RWCollectables.

When you have more than one different type of RWCollectable stored in an RWCollection, you can't use a sorted RWCollection. For example, this means that if you plan to store RWCollectableStrings and RWCollectableDates in the same RWCollection, you can't store them in a sorted RWCollection such as RWBtree. The sorted RWCollections are RWBinaryTree, RWBtree, RWBTreeDictionary, and RWSortedVector. The reason for this restriction is that the comparison functions for sorted RWCollections expect that the objects to be compared will have the same type.

4. Define All RWCollectables That Will Be Restored.

These declarations are of particular concern when you save an RWCollectable in a collection, then attempt to take advantage of polymorphic persistence by restoring the collection in a different program, without using the RWCollectable that you saved. If you don't declare the appropriate variables, during the restore attempt the RWFactory will throw an RW_NOCREATE exception for some RWCollectable class ID that you know exists. The RWFactory won't throw an RW_NOCREATE exception when you declare variables of all the RWCollectables that could be polymorphically restored.

The problem occurs because the compiler's linker only links the code that RWFactory needs to create the missing RWCollectable when that RWCollectable is specifically mentioned in your code. Declaring the missing RWCollectables gives the linker the information it needs to link the appropriate code needed by RWFactory.

What is claimed is:

1. A method of managing the processing of information using a first neural network, the information relating to the transmission of messages in a telecommunications network, the method comprising the steps of:
   (i) monitoring the performance of the first neural network in processing the information;
   (ii) creating a second neural network of the same topology as the first when a predetermined performance threshold is reached, and
   (iii) retraining the second neural network while continuing to process the information using the first neural network.

2. A method as claimed in claim 1 which further comprises the step of comparing the first and second neural networks and replacing the first neural network with the second neural network according to the result of the comparison.

3. The method of claim 1 wherein the neural networks comprise an arrangement of units and a set of weights, wherein the neural networks have the same arrangement of units, and, before retraining, have the same set of weights.

4. The method of claim 1 wherein the steps of creating and retraining the second neural network are carried out automatically.

5. The method of claim 1 further comprising the steps of:
   (i) inputting a series of inputs to the first neural network so as to obtain a series of corresponding outputs;
   (ii) inputting a set of target output values corresponding to a subset of the outputs;
   (iii) generating a set of training data which comprises information about the target output values for use in retraining the second neural net.

6. The method of claim 1 wherein the performance monitoring step comprises the steps of:
   (I) inputting a series of inputs to the neural network so as to obtain a series of corresponding outputs;
   (ii) inputting a set of target output values corresponding to a subset of the outputs; and
   (iii) comparing the output values with their respective target output values to produce a value indicative of the accuracy of the output values.

7. A method as claimed in claim 6 in which the step of obtaining a set of corresponding target output values comprises displaying information about the outputs using a user interface and accepting target output values using the user interface.

8. The method of claim 1 wherein at least the second neural network is implemented using at least one instantiated object created using an object oriented programming language and the method further comprises the steps of:
   converting the object into a data structure;
   storing the data structure; and
   recreating the object from the data structure.

9. A method of processing information relating to the transmission of messages in a telecommunications network, the method comprising the steps of:
   (i) processing the information using a first neural network; and
   (ii) managing the processing using the method of claim 1.

10. The method of claim 9 wherein the processing step comprises the step of detecting anomalies in said information.

11. A computer system for managing the processing of information using a first neural network, the information relating to the transmission of messages in a telecommunications network, the system comprising:

(i) processing means for monitoring the performance of the first neural network in processing the information;

(ii) processing means for creating a second neural network of the same topology as the first, when a predetermined performance threshold is reached, and (iii) processing means for retraining the second neural network while the information is still being processed by the first neural network.

12. A method of deriving output data from information about the transmission of messages in a communications network, using a first neural network, wherein the first neural network is implemented using at least one instantiated object created using an object oriented programming language, the method comprising the steps of;

(i) creating said first neural network such that it has the same topology as a second neural network;

(ii) converting the object into a data structure;

(iii) storing the data structure;

(iv) recreating the object from the data structure; and (v) retraining the first neural network while continuing to derive the output data using the second neural network.

13. A method as claimed in claim 12 using a first processor for step (ii) and a second processor for step (iv), further comprising the step of passing the data structure from the first processor to the second processor.

14. The method of claim 12 wherein the object is part of a daughter neural network, and the method comprises the step of moving the daughter network to enable it to be processed in parallel with a parent neural network which is said second neural network.

15. The method of claim 12 wherein the step of deriving the output data comprises the step of detecting anomalies in the information.

16. A method of deriving output data from information about the transmission of messages in a communications network, the method comprising the steps of:

(i) deriving the data from the information using a first neural network, wherein the first neural network is implemented using at least one instantiated object created using an object oriented programming language;

(i) creating a second neural network of the same topology as the first;

(ii) retraining the second neural network while continuing to derive the data from the information using the first neural network; and (iv) using a persistence mechanism to store and retrieve the object.

17. A computer system for deriving output data from information about the transmission of messages in a communications network, comprising;

(i) processor means arranged to derive the data from the information using a first neural network that is implemented using at least one instantiated object created using an object oriented programming language; said processor means being further arranged to create a second neural network of the same topology as the first, and to retrain the second neural network while continuing to derive the data from the information using the first neural network; and (ii) processor means arranged to store and retrieve the object using a persistence mechanism.

* * * * *